United States Patent
Chang et al.

(10) Patent No.: US 9,366,844 B2
(45) Date of Patent: Jun. 14, 2016

(54) MOBILE DEVICE AND OPTICAL IMAGING LENS THEREOF

(71) Applicant: GeniuS Electronic Optical Co., Ltd., Taichung (TW)

(72) Inventors: Kuo-Wen Chang, Taichung (TW); Sheng Wei Hsu, Taichung (TW); Chih-Yang Yeh, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 113 days.

(21) Appl. No.: 14/069,070

(22) Filed: Oct. 31, 2013

(65) Prior Publication Data
US 2015/0002723 A1  Jan. 1, 2015

(30) Foreign Application Priority Data
Jun. 28, 2013 (TW) .............................. 102123325 A

(51) Int. Cl.
*G02B 9/60* (2006.01)
*G02B 13/00* (2006.01)

(52) U.S. Cl.
CPC .............. *G02B 13/0045* (2013.01); *G02B 9/60* (2013.01); *G02B 13/0015* (2013.01)

(58) Field of Classification Search
CPC ............ G02B 9/00; G02B 9/60; G02B 13/00; G02B 13/001; G02B 13/0015; G02B 13/0045
See application file for complete search history.

(56) References Cited

U.S. PATENT DOCUMENTS

| | | | |
|---|---|---|---|
| 7,480,105 B2 | 1/2009 | Mori | |
| 7,710,665 B2 * | 5/2010 | Park et al. | 359/767 |
| 8,385,006 B2 | 2/2013 | Tsai et al. | |
| 8,649,113 B1 * | 2/2014 | Tsai et al. | 359/714 |
| 2011/0261471 A1 * | 10/2011 | Taniyama | 359/715 |
| 2012/0154929 A1 | 6/2012 | Tsai et al. | |
| 2012/0162769 A1 | 6/2012 | Suzuki et al. | |
| 2012/0188654 A1 | 7/2012 | Huang | |
| 2012/0194726 A1 | 8/2012 | Huang et al. | |
| 2013/0003193 A1 | 1/2013 | Huang | |
| 2013/0265650 A1 * | 10/2013 | Chen et al. | 359/714 |
| 2013/0279023 A1 * | 10/2013 | Chen | 359/714 |
| 2013/0321932 A1 * | 12/2013 | Hsu | G02B 13/0045 359/714 |

FOREIGN PATENT DOCUMENTS

| | | |
|---|---|---|
| CN | 202661703 U | 1/2013 |
| JP | 4197994 | 12/2008 |
| JP | 20108562 | 1/2010 |
| JP | 2010026434 | 2/2010 |
| JP | 2010256608 | 11/2010 |
| TW | 201239444 A | 1/2012 |
| TW | 201224506 | 6/2012 |
| TW | 201234037 | 8/2012 |
| TW | 201235694 | 9/2012 |
| TW | 201237455 | 9/2012 |

(Continued)

*Primary Examiner* — Thong Nguyen
(74) *Attorney, Agent, or Firm* — Baker & McKenzie LLP

(57) ABSTRACT

Present embodiments provide for a mobile device and an optical imaging lens thereof. The optical imaging lens comprises five lens elements positioned sequentially from an object side to an image side. Through controlling the convex or concave shape of the surfaces and/or the refracting power of the lens elements and designing an equation, the optical imaging lens shows better optical characteristics and the total length of the optical imaging lens is shortened.

17 Claims, 27 Drawing Sheets

(56) References Cited

FOREIGN PATENT DOCUMENTS

| TW | 201239444 | 10/2012 |
|---|---|---|
| TW | 201239446 | 10/2012 |
| TW | 201239447 | 10/2012 |
| TW | 201241470 | 10/2012 |
| TW | 201243386 | 11/2012 |
| TW | 201245758 | 11/2012 |
| TW | 201317618 U | 1/2013 |

* cited by examiner

| f(Focus)=2.49mm, HFOV(Half angular field of view)= 45.34deg., Fno=2.45, System length=3.773mm ||||||||
|---|---|---|---|---|---|---|---|
| Surface # | | Radius | Thickness | Refractive index | Abbe number | Material | Focus |
| - | Object | ∞ | ∞ | | | | |
| 100 | Aperture stop | ∞ | -0.04 | | | | |
| 111 | 1st lens element | 2.0734358 | 0.4041693 | 1.5459 | 56.1138 | plastic | 3.33 |
| 112 | | -13.72554 | 0.0561332 | | | | |
| 121 | 2nd lens element | -5.394003 | 0.3001268 | 1.5459 | 56.1138 | plastic | 12.47 |
| 122 | | -3.069041 | 0.1035385 | | | | |
| 131 | 3rd lens element | 43.551528 | 0.22 | 1.6446 | 23.5281 | plastic | -5.12 |
| 132 | | 3.0608399 | 0.349453 | | | | |
| 141 | 4th lens element | -1.656536 | 0.5837333 | 1.5459 | 56.1138 | plastic | 1.62 |
| 142 | | -0.647816 | 0.05 | | | | |
| 151 | 5th lens element | 2.7655287 | 0.6055142 | 1.5459 | 56.1138 | plastic | -1.92 |
| 152 | | 0.7025548 | 0.6 | | | | |
| 161 | IR cut filter | ∞ | 0.21 | | | | |
| 162 | | ∞ | 0.2899989 | | | | |
| 170 | Image plane | ∞ | | | | | |

FIG. 4

| Aspherical parameters | | | | | |
|---|---|---|---|---|---|
| Surface # | 111 | 112 | 121 | 122 | 131 |
| K | -8.77E+00 | 0.00E+00 | 0.00E+00 | -3.45E+01 | 0.00E+00 |
| $a_4$ | 6.38E-03 | -6.24E-02 | 1.58E-01 | -2.42E-01 | -6.66E-01 |
| $a_6$ | 3.05E-01 | -9.73E-01 | -1.08E+00 | 3.20E-02 | 1.54E-02 |
| $a_8$ | -3.61E+00 | | | -6.31E-01 | -1.70E-01 |
| $a_{10}$ | 1.09E+01 | | | 7.66E-01 | 6.31E-01 |
| $a_{12}$ | -1.43E+01 | | | -7.96E-01 | |
| $a_{14}$ | | | | | |
| $a_{16}$ | | | | | |
| Surface # | 132 | 141 | 142 | 151 | 152 |
| K | 0.00E+00 | 0.00E+00 | -1.00E+00 | 0.00E+00 | -5.23E+00 |
| $a_4$ | -3.81E-01 | 1.63E-01 | 5.55E-01 | -1.46E-01 | -6.23E-02 |
| $a_6$ | 1.68E-01 | -3.92E-03 | -1.51E+00 | 6.87E-02 | 2.09E-02 |
| $a_8$ | 1.42E-01 | -3.11E-02 | 3.60E+00 | -6.84E-02 | -7.40E-03 |
| $a_{10}$ | -3.85E-01 | 4.70E-02 | -5.78E+00 | 5.00E-02 | 1.48E-03 |
| $a_{12}$ | 2.43E-01 | -2.38E-02 | 5.71E+00 | -1.93E-02 | -1.24E-04 |
| $a_{14}$ | | -6.62E-03 | -2.93E+00 | 3.89E-03 | 0.00E+00 |
| $a_{16}$ | | | 5.90E-01 | -3.74E-04 | 0.00E+00 |

FIG. 5

| f(Focus)=3.08mm, HFOV(Half angular field of view)= 38.49 deg., Fno=2.45, System length=4.448mm | | | | | | | |
|---|---|---|---|---|---|---|---|
| Surface # | | Radius | Thickness | Refractive index | Abbe number | Material | Focus |
| - | Object | ∞ | ∞ | | | | |
| 200 | Aperture stop | ∞ | -0.051553 | | | | |
| 211 | 1st lens element | 2.0623881 | 0.477553 | 1.5459 | 56.1138 | plastic | 3.08 |
| 212 | | -8.302872 | 0.05 | | | | |
| 221 | 2nd lens element | -5.233105 | 0.4330508 | 1.5459 | 56.1138 | plastic | 10.73 |
| 222 | | -2.844157 | 0.0538281 | | | | |
| 231 | 3rd lens element | -140.518 | 0.22 | 1.6446 | 23.5281 | plastic | -4.6 |
| 232 | | 3.0310299 | 0.3209181 | | | | |
| 241 | 4th lens element | -1.217512 | 0.7518015 | 1.5459 | 56.1138 | plastic | 1.89 |
| 242 | | -0.679983 | 0.0866912 | | | | |
| 251 | 5th lens element | 1.8143782 | 0.3524607 | 1.5459 | 56.1138 | plastic | -2.62 |
| 252 | | 0.7456883 | 0.6 | | | | |
| 261 | IR cut filter | ∞ | 0.21 | | | | |
| 262 | | ∞ | 0.8912166 | | | | |
| 270 | Image plane | ∞ | | | | | |

FIG. 8

| Aspherical parameters | | | | | |
|---|---|---|---|---|---|
| Surface # | 211 | 212 | 221 | 222 | 231 |
| K | -8.77E+00 | 0.00E+00 | 0.00E+00 | -3.45E+01 | 0.00E+00 |
| $a_4$ | 4.12E-02 | 3.07E-03 | 2.02E-01 | -2.72E-01 | -6.65E-01 |
| $a_6$ | 3.66E-01 | -1.00E+00 | -1.04E+00 | 1.18E-01 | -5.02E-02 |
| $a_8$ | -3.70E+00 | | | -4.97E-01 | -1.88E-01 |
| $a_{10}$ | 1.13E+01 | | | 7.72E-01 | 6.14E-01 |
| $a_{12}$ | -1.43E+01 | | | -8.33E-01 | -3.69E-02 |
| $a_{14}$ | | | | | |
| $a_{16}$ | | | | | |
| Surface # | 232 | 241 | 242 | 251 | 252 |
| K | 0.00E+00 | 0.00E+00 | -1.00E+00 | 0.00E+00 | -5.23E+00 |
| $a_4$ | -3.99E-01 | 1.58E-01 | 5.50E-01 | -2.35E-01 | -9.21E-02 |
| $a_6$ | 1.12E-01 | 1.92E-02 | -1.55E+00 | 8.69E-02 | 1.78E-02 |
| $a_8$ | 8.44E-02 | -1.51E-02 | 3.61E+00 | -6.90E-02 | -4.07E-03 |
| $a_{10}$ | -3.86E-01 | 5.87E-02 | -5.78E+00 | 4.96E-02 | 1.35E-03 |
| $a_{12}$ | 2.90E-01 | -3.11E-02 | 5.71E+00 | -1.95E-02 | -2.51E-04 |
| $a_{14}$ | | -2.31E-02 | -2.93E+00 | 3.80E-03 | |
| $a_{16}$ | | | 5.90E-01 | -3.78E-04 | |

FIG. 9

| f(Focus)=2.49mm, HFOV(Half angular field of view)= 44.42deg., Fno=2.45, System length=3.934mm ||||||||
|---|---|---|---|---|---|---|---|
| Surface # | | Radius | Thickness | Refractive index | Abbe number | Material | Focus |
| - | Object | ∞ | ∞ | | | | |
| 300 | Aperture stop | ∞ | -0.053192 | | | | |
| 311 | 1st lens element | 2.0122754 | 0.5418455 | 1.5459 | 56.1138 | plastic | 2.95 |
| 312 | | -7.357848 | 0.0683228 | | | | |
| 321 | 2nd lens element | -4.108166 | 0.3087657 | 1.5459 | 56.1138 | plastic | 12.46 |
| 322 | | -2.628911 | 0.05 | | | | |
| 331 | 3rd lens element | -9.599055 | 0.3000262 | 1.6446 | 23.5281 | plastic | -3.74 |
| 332 | | 3.2571109 | 0.2805384 | | | | |
| 341 | 4th lens element | -1.824781 | 0.6509372 | 1.5459 | 56.1138 | plastic | 1.54 |
| 342 | | -0.649179 | 0.05 | | | | |
| 351 | 5th lens element | 2.6922555 | 0.5839414 | 1.5459 | 56.1138 | plastic | -1.98 |
| 352 | | 0.713208 | 0.6 | | | | |
| 361 | IR cut filter | ∞ | 0.21 | | | | |
| 362 | | ∞ | 0.2899984 | | | | |
| 370 | Image plane | ∞ | | | | | |

FIG. 12

| Aspherical parameters | | | | | |
|---|---|---|---|---|---|
| Surface # | 311 | 312 | 321 | 322 | 331 |
| K | -8.77E+00 | 0.00E+00 | 0.00E+00 | -3.45E+01 | 0.00E+00 |
| $a_4$ | 5.70E-02 | -9.33E-02 | 1.95E-01 | -2.39E-01 | -6.90E-01 |
| $a_6$ | 3.26E-01 | -9.15E-01 | -1.22E+00 | -1.03E-02 | -3.51E-02 |
| $a_8$ | -3.54E+00 | | | -6.86E-01 | -1.77E-01 |
| $a_{10}$ | 1.11E+01 | | | 8.37E-01 | 6.77E-01 |
| $a_{12}$ | -1.43E+01 | | | -5.07E-01 | -2.93E-02 |
| $a_{14}$ | | | | | |
| $a_{16}$ | | | | | |
| Surface # | 332 | 341 | 342 | 351 | 352 |
| K | 0.00E+00 | 0.00E+00 | -1.00E+00 | 0.00E+00 | -5.23E+00 |
| $a_4$ | -3.45E-01 | 1.76E-01 | 5.54E-01 | -1.48E-01 | -6.02E-02 |
| $a_6$ | 1.69E-01 | -1.03E-02 | -1.52E+00 | 6.40E-02 | 1.85E-02 |
| $a_8$ | 1.22E-01 | -4.23E-02 | 3.60E+00 | -6.79E-02 | -6.87E-03 |
| $a_{10}$ | -4.07E-01 | 5.01E-02 | -5.78E+00 | 5.04E-02 | 1.47E-03 |
| $a_{12}$ | 2.17E-01 | -2.27E-02 | 5.71E+00 | -1.93E-02 | -1.31E-04 |
| $a_{14}$ | | -1.25E-02 | -2.93E+00 | 3.86E-03 | |
| $a_{16}$ | | | 5.89E-01 | -3.78E-04 | |

FIG. 13

| f(Focus)=2.67mm, HFOV(Half angular field of view)= 42.40 deg., Fno=2.45, System length=3.930mm ||||||||
|---|---|---|---|---|---|---|---|
| Surface # | | Radius | Thickness | Refractive index | Abbe number | Material | Focus |
| - | Object | ∞ | ∞ | | | | |
| 400 | Aperture stop | ∞ | -0.04 | | | | |
| 411 | 1st lens element | 2.1094315 | 0.4232561 | 1.5459 | 56.1138 | plastic | 3.48 |
| 412 | | -17.91769 | 0.05 | | | | |
| 421 | 2nd lens element | -5.86177 | 0.3098022 | 1.5459 | 56.1138 | plastic | 9.95 |
| 422 | | -2.872089 | 0.1002325 | | | | |
| 431 | 3rd lens element | 150 | 0.2296144 | 1.6446 | 23.5281 | plastic | -5.3 |
| 432 | | 3.3389435 | 0.4216373 | | | | |
| 441 | 4th lens element | -1.400922 | 0.5651537 | 1.5459 | 56.1138 | plastic | 1.75 |
| 442 | | -0.647854 | 0.0526052 | | | | |
| 451 | 5th lens element | 2.2812941 | 0.5329954 | 1.5459 | 56.1138 | plastic | -2.12 |
| 452 | | 0.7041144 | 0.6 | | | | |
| 461 | IR cut filter | ∞ | 0.21 | | | | |
| 462 | | ∞ | 0.4344385 | | | | |
| 470 | Image plane | ∞ | | | | | |

FIG. 16

| Aspherical parameters | | | | | |
|---|---|---|---|---|---|
| Surface # | 411 | 412 | 421 | 422 | 431 |
| K | -8.77E+00 | 0.00E+00 | 0.00E+00 | -3.45E+01 | 0.00E+00 |
| $a_4$ | 1.47E-02 | 2.39E-02 | 2.40E-01 | -2.93E-01 | -6.68E-01 |
| $a_6$ | 3.04E-01 | -1.12E+00 | -1.22E+00 | 5.45E-02 | 2.42E-02 |
| $a_8$ | -3.60E+00 | | | -5.20E-01 | -1.80E-01 |
| $a_{10}$ | 1.11E+01 | | | 8.37E-01 | 6.80E-01 |
| $a_{12}$ | -1.43E+01 | | | -8.15E-01 | -2.92E-02 |
| $a_{14}$ | | | | | |
| $a_{16}$ | | | | | |
| Surface # | 432 | 441 | 442 | 451 | 452 |
| K | 0.00E+00 | 0.00E+00 | -1.00E+00 | 0.00E+00 | -5.23E+00 |
| $a_4$ | -3.74E-01 | 1.70E-01 | 5.69E-01 | -1.80E-01 | -6.81E-02 |
| $a_6$ | 1.47E-01 | 3.03E-03 | -1.53E+00 | 7.47E-02 | 1.77E-02 |
| $a_8$ | 1.20E-01 | -2.61E-02 | 3.61E+00 | -6.92E-02 | -5.44E-03 |
| $a_{10}$ | -3.86E-01 | 5.25E-02 | -5.78E+00 | 5.02E-02 | 1.13E-03 |
| $a_{12}$ | 2.63E-01 | -2.23E-02 | 5.71E+00 | -1.93E-02 | -1.07E-04 |
| $a_{14}$ | | -5.80E-03 | -2.93E+00 | 3.86E-03 | |
| $a_{16}$ | | | 5.89E-01 | -3.79E-04 | |

FIG. 17

| f(Focus)=2.67mm, HFOV(Half angular field of view)= 42.47deg., Fno=2.45, System length=3.935mm ||||||||
|---|---|---|---|---|---|---|---|
| Surface # | | Radius | Thickness | Refractive index | Abbe number | Material | Focus |
| - | Object | ∞ | ∞ | | | | |
| 500 | Aperture stop | ∞ | -0.04 | | | | |
| 511 | 1st lens element | 2.1178034 | 0.4176439 | 1.5459 | 56.1138 | plastic | 3.51 |
| 512 | | -18.75335 | 0.0518016 | | | | |
| 521 | 2nd lens element | -5.910674 | 0.3013321 | 1.5459 | 56.1138 | plastic | 10 |
| 522 | | -2.889112 | 0.1106537 | | | | |
| 531 | 3rd lens element | -150 | 0.2454035 | 1.6446 | 23.5281 | plastic | -5.14 |
| 532 | | 3.3893679 | 0.4115339 | | | | |
| 541 | 4th lens element | -1.426505 | 0.5669758 | 1.5459 | 56.1138 | plastic | 1.71 |
| 542 | | -0.643758 | 0.0512622 | | | | |
| 551 | 5th lens element | 2.2905058 | 0.533296 | 1.5459 | 56.1138 | plastic | -2.1 |
| 552 | | 0.7008238 | 0.6 | | | | |
| 561 | IR cut filter | ∞ | 0.21 | | | | |
| 562 | | ∞ | 0.4353313 | | | | |
| 570 | Image plane | ∞ | | | | | |

FIG. 20

| Aspherical parameters | | | | | |
|---|---|---|---|---|---|
| Surface # | 511 | 512 | 521 | 522 | 531 |
| K | -8.77E+00 | 0.00E+00 | 0.00E+00 | -3.45E+01 | 0.00E+00 |
| $a_4$ | 1.10E-02 | 2.47E-02 | 2.45E-01 | -2.91E-01 | -6.73E-01 |
| $a_6$ | 2.99E-01 | -1.12E+00 | -1.21E+00 | 5.37E-02 | 2.48E-02 |
| $a_8$ | -3.62E+00 | | | -5.15E-01 | -1.61E-01 |
| $a_{10}$ | 1.11E+01 | | | 8.34E-01 | 6.28E-01 |
| $a_{12}$ | -1.43E+01 | | | -8.62E-01 | -4.94E-03 |
| $a_{14}$ | | | | | |
| $a_{16}$ | | | | | |
| Surface # | 532 | 541 | 542 | 551 | 552 |
| K | 0.00E+00 | 0.00E+00 | -1.00E+00 | 0.00E+00 | -5.23E+00 |
| $a_4$ | -3.70E-01 | 1.66E-01 | 5.71E-01 | -1.76E-01 | -6.83E-02 |
| $a_6$ | 1.47E-01 | 2.71E-03 | -1.53E+00 | 7.41E-02 | 1.80E-02 |
| $a_8$ | 1.21E-01 | -2.74E-02 | 3.61E+00 | -6.92E-02 | -5.64E-03 |
| $a_{10}$ | -3.90E-01 | 5.16E-02 | -5.78E+00 | 5.02E-02 | 1.19E-03 |
| $a_{12}$ | 2.54E-01 | -2.15E-02 | 5.71E+00 | -1.93E-02 | -1.13E-04 |
| $a_{14}$ | | -8.46E-03 | -2.93E+00 | 3.87E-03 | |
| $a_{16}$ | | | 5.89E-01 | -3.80E-04 | |

FIG. 21

| f(Focus)=2.69mm, HFOV(Half angular field of view)= 42.87 deg., Fno=2.45, System length=4.030mm ||||||||
|---|---|---|---|---|---|---|---|
| Surface # | | Radius | Thickness | Refractive index | Abbe number | Material | Focus |
| - | Object | ∞ | ∞ | | | | |
| 600 | Aperture stop | ∞ | -0.053154 | | | | |
| 611 | 1st lens element | 2.0534351 | 0.6827928 | 1.5459 | 56.1138 | plastic | 3.03 |
| 612 | | -7.524582 | 0.1 | | | | |
| 621 | 2nd lens element | -2.715106 | 0.3 | 1.5459 | 56.1138 | plastic | 34.2 |
| 622 | | -2.462915 | 0.1 | | | | |
| 631 | 3rd lens element | 150 | 0.22 | 1.6446 | 23.5281 | plastic | -5.81 |
| 632 | | 3.6525264 | 0.3528551 | | | | |
| 641 | 4th lens element | -1.606774 | 0.5376844 | 1.5459 | 56.1138 | plastic | 1.62 |
| 642 | | -0.637067 | 0.1 | | | | |
| 651 | 5th lens element | 3.4052669 | 0.5764872 | 1.5459 | 56.1138 | plastic | -1.74 |
| 652 | | 0.6991105 | 0.6 | | | | |
| 661 | IR cut filter | ∞ | 0.21 | | | | |
| 662 | | ∞ | 0.2505328 | | | | |
| 670 | Image plane | ∞ | | | | | |

FIG. 24

| Aspherical parameters | | | | | |
|---|---|---|---|---|---|
| Surface # | 611 | 612 | 621 | 622 | 631 |
| K | -8.77E+00 | 0.00E+00 | 0.00E+00 | -3.45E+01 | 0.00E+00 |
| $a_4$ | 5.34E-02 | -1.15E-01 | 7.48E-02 | -2.87E-01 | -6.46E-01 |
| $a_6$ | 4.01E-01 | -6.28E-01 | -1.03E+00 | -2.05E-02 | -4.45E-02 |
| $a_8$ | -3.68E+00 | | | -6.50E-01 | -2.52E-01 |
| $a_{10}$ | 1.18E+01 | | | 8.14E-01 | 6.14E-01 |
| $a_{12}$ | -1.43E+01 | | | -3.96E-01 | -7.57E-02 |
| $a_{14}$ | | | | | |
| $a_{16}$ | | | | | |
| Surface # | 632 | 641 | 642 | 651 | 652 |
| K | 0.00E+00 | 0.00E+00 | -1.00E+00 | 0.00E+00 | -5.23E+00 |
| $a_4$ | -4.11E-01 | 1.35E-01 | 5.50E-01 | -1.51E-01 | -6.26E-02 |
| $a_6$ | 1.81E-01 | -1.76E-03 | -1.52E+00 | 7.73E-02 | 2.34E-02 |
| $a_8$ | 1.38E-01 | -2.45E-02 | 3.60E+00 | -6.92E-02 | -7.12E-03 |
| $a_{10}$ | -3.97E-01 | 4.38E-02 | -5.78E+00 | 5.03E-02 | 1.31E-03 |
| $a_{12}$ | 2.13E-01 | -2.85E-02 | 5.71E+00 | -1.93E-02 | -1.01E-04 |
| $a_{14}$ | | -7.62E-03 | -2.93E+00 | 3.85E-03 | |
| $a_{16}$ | | | 5.91E-01 | -3.79E-04 | |

FIG. 25

| f(Focus)=2.61mm, HFOV(Half angular field of view)= 43.31 deg., Fno=2.45, System length=3.988mm ||||||||
|---|---|---|---|---|---|---|---|
| Surface # | | Radius | Thickness | Refractive index | Abbe number | Material | Focus |
| - | Object | ∞ | ∞ | | | | |
| 700 | Aperture stop | ∞ | -0.053943 | | | | |
| 711 | 1st lens element | 2.0186005 | 0.5615345 | 1.5459 | 56.1138 | plastic | 2.89 |
| 712 | | -6.552633 | 0.05 | | | | |
| 721 | 2nd lens element | -3.269172 | 0.3 | 1.5459 | 56.1138 | plastic | 47.12 |
| 722 | | -2.99458 | 0.0933129 | | | | |
| 731 | 3rd lens element | -22.4482 | 0.31165 | 1.6446 | 23.5281 | plastic | -4.8 |
| 732 | | 3.6055059 | 0.3641854 | | | | |
| 741 | 4th lens element | -1.637329 | 0.55 | 1.5459 | 56.1138 | plastic | 1.6 |
| 742 | | -0.637149 | 0.05 | | | | |
| 751 | 5th lens element | 2.748579 | 0.6071532 | 1.5459 | 56.1138 | plastic | -1.9 |
| 752 | | 0.6919658 | 0.6 | | | | |
| 761 | IR cut filter | ∞ | 0.21 | | | | |
| 762 | | ∞ | 0.2899698 | | | | |
| 770 | Image plane | ∞ | | | | | |

FIG. 28

| Aspherical parameters | | | | | |
|---|---|---|---|---|---|
| Surface # | 711 | 712 | 721 | 722 | 731 |
| K | -8.77E+00 | 0.00E+00 | 0.00E+00 | -3.45E+01 | 0.00E+00 |
| $a_4$ | 5.63E-02 | 1.45E-02 | 2.37E-01 | -2.98E-01 | -7.05E-01 |
| $a_6$ | 3.53E-01 | -1.09E+00 | -1.28E+00 | 6.58E-02 | 1.85E-02 |
| $a_8$ | -3.54E+00 | | | -4.84E-01 | -1.84E-01 |
| $a_{10}$ | 1.13E+01 | | | 8.76E-01 | 6.04E-01 |
| $a_{12}$ | -1.43E+01 | | | -7.39E-01 | -4.73E-02 |
| $a_{14}$ | | | | | |
| $a_{16}$ | | | | | |
| Surface # | 732 | 741 | 742 | 751 | 752 |
| K | 0.00E+00 | 0.00E+00 | -1.00E+00 | 0.00E+00 | -5.23E+00 |
| $a_4$ | -3.39E-01 | 1.65E-01 | 5.62E-01 | -1.62E-01 | -6.89E-02 |
| $a_6$ | 1.48E-01 | -3.58E-03 | -1.53E+00 | 7.02E-02 | 2.28E-02 |
| $a_8$ | 1.18E-01 | -3.16E-02 | 3.61E+00 | -6.87E-02 | -7.48E-03 |
| $a_{10}$ | -4.02E-01 | 4.77E-02 | -5.77E+00 | 5.04E-02 | 1.44E-03 |
| $a_{12}$ | 2.26E-01 | -2.27E-02 | 5.71E+00 | -1.92E-02 | -1.21E-04 |
| $a_{14}$ | | -5.14E-03 | -2.93E+00 | 3.86E-03 | |
| $a_{16}$ | | | 5.89E-01 | -3.83E-04 | |

FIG. 29

| f(Focus)=2.57mm, HFOV(Half angular field of view)= 43.60 deg., Fno=2.45, System length=3.953mm ||||||||
|---|---|---|---|---|---|---|---|
| Surface # | | Radius | Thickness | Refractive index | Abbe number | Material | Focus |
| - | Object | ∞ | ∞ | | | | |
| 800 | Aperture stop | ∞ | -0.043826 | | | | |
| 811 | 1st lens element | 2.0221643 | 0.5263508 | 1.5459 | 56.1138 | plastic | 2.93 |
| 812 | | -6.973109 | 0.0534289 | | | | |
| 821 | 2nd lens element | -3.610102 | 0.3 | 1.5459 | 56.1138 | plastic | 16.98 |
| 822 | | -2.674386 | 0.0750167 | | | | |
| 831 | 3rd lens element | -31.73683 | 0.22 | 1.6446 | 23.5281 | plastic | -4.99 |
| 832 | | 3.5879855 | 0.3193397 | | | | |
| 841 | 4th lens element | -1.554854 | 0.6824817 | 1.5459 | 56.1138 | plastic | 1.64 |
| 842 | | -0.656668 | 0.05 | | | | |
| 851 | 5th lens element | 2.5876712 | 0.5699335 | 1.5459 | 56.1138 | plastic | -1.99 |
| 852 | | 0.7053192 | 0.6 | | | | |
| 861 | IR cut filter | ∞ | 0.21 | | | | |
| 862 | | ∞ | 0.3464123 | | | | |
| 870 | Image plane | ∞ | | | | | |

FIG. 32

| Aspherical parameters | | | | | |
|---|---|---|---|---|---|
| Surface # | 811 | 812 | 821 | 822 | 831 |
| K | -8.77E+00 | 0.00E+00 | 0.00E+00 | -3.45E+01 | 0.00E+00 |
| $a_4$ | 4.89E-02 | -1.44E-02 | 2.13E-01 | -2.82E-01 | -6.90E-01 |
| $a_6$ | 3.83E-01 | -1.08E+00 | -1.30E+00 | 5.29E-02 | -1.37E-02 |
| $a_8$ | -3.66E+00 | | | -5.34E-01 | -1.79E-01 |
| $a_{10}$ | 1.12E+01 | | | 8.38E-01 | 6.36E-01 |
| $a_{12}$ | -1.43E+01 | | | -7.07E-01 | 2.58E-02 |
| $a_{14}$ | | | | | |
| $a_{16}$ | | | | | |
| Surface # | 832 | 841 | 842 | 851 | 852 |
| K | 0.00E+00 | 0.00E+00 | -1.00E+00 | 0.00E+00 | -5.23E+00 |
| $a_4$ | -3.63E-01 | 1.87E-01 | 5.60E-01 | -1.64E-01 | -6.29E-02 |
| $a_6$ | 1.53E-01 | 6.02E-03 | -1.53E+00 | 7.21E-02 | 1.85E-02 |
| $a_8$ | 1.17E-01 | -2.58E-02 | 3.61E+00 | -6.80E-02 | -6.38E-03 |
| $a_{10}$ | -3.99E-01 | 4.78E-02 | -5.78E+00 | 5.02E-02 | 1.37E-03 |
| $a_{12}$ | 2.51E-01 | -2.92E-02 | 5.71E+00 | -1.93E-02 | -1.27E-04 |
| $a_{14}$ | | -1.21E-02 | -2.93E+00 | 3.85E-03 | |
| $a_{16}$ | | | 5.89E-01 | -3.80E-04 | |

FIG. 33

| Embodiment | 1st Embodiment | 2nd Embodiment | 3rd Embodiment | 4th Embodiment | 5th Embodiment | 6th Embodiment | 7th Embodiment | 8th Embodiment |
|---|---|---|---|---|---|---|---|---|
| TL/CT5 | 4.41 | 7.79 | 4.85 | 5.04 | 5.04 | 5.15 | 4.76 | 4.91 |
| (AC23+AC34)/CT3 | 2.06 | 1.70 | 1.10 | 2.27 | 2.13 | 2.06 | 1.47 | 1.79 |
| TL/AAG | 4.78 | 5.37 | 6.31 | 4.30 | 4.30 | 4.55 | 5.18 | 5.62 |
| (CT1+CT5)/CT3 | 4.59 | 3.77 | 3.75 | 4.16 | 3.88 | 5.72 | 3.75 | 4.98 |
| TL/(AC12+AC23+AC45) | 12.75 | 14.41 | 16.84 | 13.24 | 12.59 | 9.90 | 14.94 | 15.67 |
| CT5/(AC12+AC23+AC45) | 2.89 | 1.85 | 3.47 | 2.63 | 2.50 | 1.92 | 3.14 | 3.19 |
| CT4/CT3 | 2.65 | 3.42 | 2.17 | 2.46 | 2.31 | 2.44 | 1.76 | 3.10 |
| AC23/(AC12+AC45) | 0.98 | 0.39 | 0.42 | 0.98 | 1.07 | 0.50 | 0.93 | 0.73 |
| AC34/(AC12+AC23+AC45) | 1.67 | 1.68 | 1.67 | 2.08 | 1.93 | 1.18 | 1.88 | 1.79 |
| CT1/(AC12+AC23+AC45) | 1.93 | 2.51 | 3.22 | 2.09 | 1.95 | 2.28 | 2.90 | 2.95 |
| CT4/(AC12+AC45) | 5.50 | 5.50 | 5.50 | 5.51 | 5.50 | 2.69 | 5.50 | 6.60 |
| TL/AC34 | 7.65 | 8.56 | 10.10 | 6.37 | 6.54 | 8.42 | 7.93 | 8.76 |
| (CT1+CT4+CT5)/CT3 | 7.24 | 7.19 | 5.92 | 6.63 | 6.19 | 8.17 | 5.51 | 8.09 |
| AAG/AC34 | 1.60 | 1.59 | 1.60 | 1.48 | 1.52 | 1.85 | 1.53 | 1.56 |

FIG. 34

MOBILE DEVICE AND OPTICAL IMAGING LENS THEREOF

INCORPORATION BY REFERENCE

This application claims priority from R.O.C. Patent Application No. 102123325, filed on Jun. 28, 2013, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND

The ever-increasing demand for smaller sized mobile devices, such as cell phones, digital cameras, etc., correspondingly triggered a growing need for a smaller sized photography module, comprising elements such as an optical imaging lens, a module housing unit, and an image sensor, etc., contained therein. Size reductions may be obtained from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics become a challenging problem.

Both U.S. Pat. No. 7,480,105 and Japan Patent Publication No. 4197994 disclose an optical imaging lens constructed with an optical imaging lens having five lens elements, wherein the length of the optical imaging lens, from the object-side surface of the first lens element to the image plane, reaches 8 mm, which is too long for smaller sized mobile devices. Therefore, there is a need to develop an optical imaging lens which is capable of placing five lens elements therein, with a shorter length, while also have good optical characteristics.

SUMMARY

An object of the present invention is to provide a mobile device and an optical imaging lens thereof. With controlling the convex or concave shape of the surfaces and/or the refracting power of the lens elements and designing an equation, the length of the optical imaging lens is shortened and meanwhile the good optical characteristics and system functionality are maintained.

In an exemplary embodiment, an optical imaging lens comprises, sequentially from an object side to an image side along an optical axis, which comprises first, second, third, fourth and fifth lens elements, each of the first, second, third, fourth and fifth lens elements having an object-side surface facing toward the object side and an image-side surface facing toward the image side. The object-side surface of the first lens element comprises a convex portion in a vicinity of the optical axis. The second lens element has positive refracting power. The image-side surface of the fourth lens element comprises a convex portion in a vicinity of the optical axis. The image-side surface of the fifth lens element comprises a concave portion in a vicinity of the optical axis and a convex portion in a vicinity of a periphery of the fifth lens element. The optical imaging lens as a whole comprises only the five lens elements having refracting power and the distance between the object-side surface of the first lens element and the image-side surface of the fifth lens element along the optical axis is TL. A central thickness of the fifth lens element along the optical axis is CT5, and TL and CT5 satisfy the equation:

$$TL/CT5 \leq 7.80 \qquad \text{Equation (1)}.$$

In another exemplary embodiment, other equation(s), such as those relating to the ratio among parameters could be taken into consideration. For example, a central thickness of the third lens element along the optical axis is CT3. An air gap between the second lens element and the third lens element along the optical axis is AC23. An air gap between the third lens element and the fourth lens element along the optical axis is AC34, that could be controlled to satisfy the equation as follows:

$$1.10 \leq (AC23+AC34)/CT3 \qquad \text{Equation (2); or}$$

TL and the sum of all four air gaps from the first lens element to the fifth lens element along the optical axis, AAG, could be controlled to satisfy the equation(s) as follows:

$$4.30 \leq TL/AAG \qquad \text{Equation (3); or}$$

CT3, CT5 and a central thickness of the first lens element along the optical axis, CT1, could be controlled to satisfy the equation as follows:

$$3.75 \leq (CT1+CT5)/CT3 \qquad \text{Equation (4); or}$$

TL, AC23, an air gap between the first lens element and the second lens element along the optical axis, AC12, and an air gap between the fourth lens element and the fifth lens element along the optical axis, AC45, could be controlled to satisfy the equation as follows:

$$9.80 \leq TL/(AC12+AC23+AC45) \qquad \text{Equation (5); or}$$

CT5, AC12, AC23 and AC45 could be controlled to satisfy the equation as follows:

$$1.85 \leq CT5/(AC12+AC23+AC45) \qquad \text{Equation (6); or}$$

CT3 and a central thickness of the fourth lens element along the optical axis, CT4, could be controlled to satisfy the equation as follows:

$$1.60 \leq CT4/CT3 \leq 3.40 \qquad \text{Equation (7); or}$$

AC12, AC23 and AC45 could be controlled to satisfy the equation as follows:

$$AC23/(AC12+AC45) \leq 2.00 \qquad \text{Equation (8); or}$$

AC12, AC23, AC34 and AC45 could be controlled to satisfy the equation as follows:

$$1.60 \leq AC34/(AC12+AC23+AC45) \qquad \text{Equation (9); or}$$

CT1, AC12, AC23 and AC45 could be controlled to satisfy the equation as follows:

$$1.80 \leq CT1/(AC12+AC23+AC45) \qquad \text{Equation (10); or}$$

CT4, AC12 and AC45 could be controlled to satisfy the equation as follows:

$$5.50 \leq CT4/(AC12+AC45) \qquad \text{Equation (11); or}$$

TL and AC34 could be controlled to satisfy the equation as follows:

$$TL/AC34 \leq 10.30 \qquad \text{Equation (12); or}$$

CT1, CT3, CT4 and CT5 could be controlled to satisfy the equation as follows:

$$4.00 \leq (CT1+CT4+CT5)/CT3 \qquad \text{Equation (13); or}$$

AAG and AC34 could be controlled to satisfy the equation as follows:

$$AAG/AC34 \leq 1.60 \qquad \text{Equation (14).}$$

Aforesaid exemplary embodiments are not limited and could be selectively incorporated in other embodiments described herein.

In some exemplary embodiments, more details about the convex or concave surface structure or the position of an aperture stop could be incorporated for one specific lens element or broadly for plural lens elements to enhance the control for the system performance and/or resolution. For example, an aperture stop could be positioned before the first lens element, etc. It is noted that the details listed here could be incorporated in example embodiments if no inconsistency occurs.

In another exemplary embodiment, a mobile device comprising a housing and a photography module positioned in the housing is provided. The photography module comprises any of the aforesaid example embodiments of optical imaging lens, such as, a lens barrel, a module housing unit and an image sensor. The lens barrel is for positioning the optical imaging lens, the module housing unit is for positioning the lens barrel, the substrate is for positioning the module housing unit and the image sensor is positioned at the image side of the optical imaging lens.

Through controlling the convex or concave shape of the surfaces and/or the refraction power of the lens element(s), the mobile device and the optical imaging lens thereof in exemplary embodiments achieve good optical characteristics and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of a eighth embodiment of the present disclosure;

FIG. 33 is a table of aspherical data of a eighth embodiment of the optical imaging lens according to the present disclosure;

FIG. 34 is a table for the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 of all eighth example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
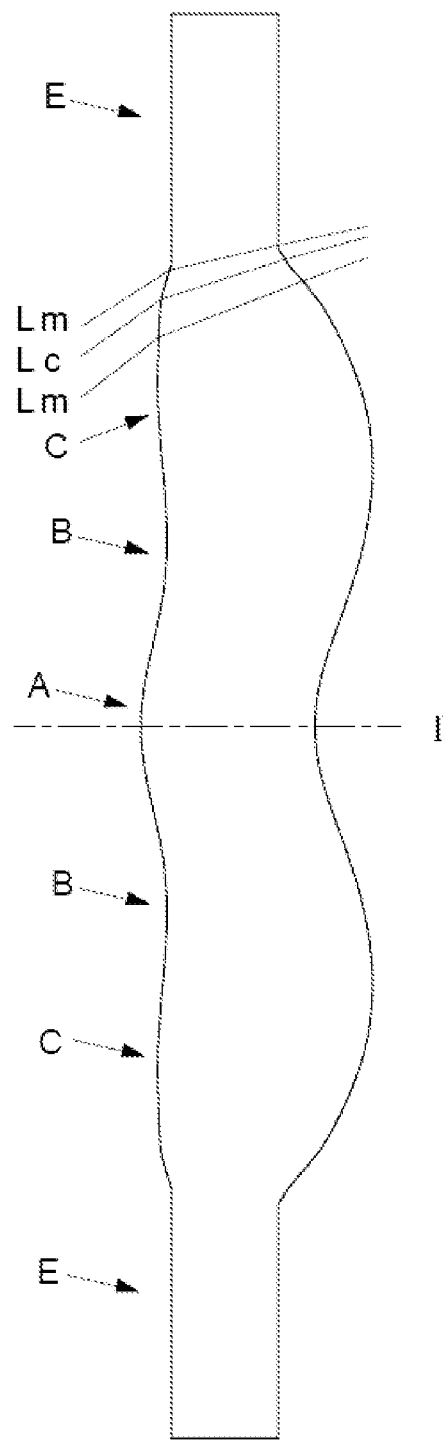
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1, for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e., the region C as shown in FIG. 1. The imaging light comprises chief ray Lc and marginal ray Lm. "In a vicinity of the optical axis" means that in a vicinity of the optical axis of a surface for passing the imaging light on the lens element, i.e., the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also note that the extending portion of all the lens elements in the example embodiments shown below are not shown in order to maintain clean and concise drawings.

Example embodiments of an optical imaging lens may comprise a first lens element, a second lens element, a third lens element, a fourth lens element and a fifth lens element, each of the lens elements comprise an object-side surface facing toward an object side and an image-side surface facing toward an image side. These lens elements may be arranged sequentially from the object side to the image side along an optical axis, and example embodiments of the lens as a whole may comprise only the five lens elements having refracting power. In an example embodiment: the object-side surface of the first lens element comprises a convex portion in a vicinity of the optical axis; the second lens element has positive refracting power; the image-side surface of the fourth lens element comprises a convex portion in a vicinity of the optical axis; the image-side surface of the fifth lens element comprises a concave portion in a vicinity of the optical axis and a convex portion in a vicinity of a periphery of the fifth lens element; and the distance between the object-side surface of the first lens element and the image-side surface of the fifth lens element is TL, a central thickness of the fifth lens element along the optical axis is CT5, and TL and CT5 satisfy the equation:

$$TL/CT5 \leq 7.80 \qquad \text{Equation (1).}$$

Preferably, the lens elements are designed in light of the optical characteristics and the length of the optical imaging lens. For example, the second lens element having positive refracting power can assist in increasing the light convergence ability of the optical imaging lens, and combined with the aperture stop positioned before the first lens element, the length of the optical imaging lens can be effectively shortened. All the details of shape on the surfaces of the lens elements, such as the convex portion in a vicinity of the optical axis on the object-side surface of the first lens element, the convex portion in a vicinity of the optical axis on the image-side surface of the fourth lens element, the concave portion in a vicinity of the optical axis on the image-side surface of the fifth lens element and the convex portion in a vicinity of a periphery of the fifth lens element on the image-side surface thereof, could assist in eliminating the aberration of the optical imaging lens. Additionally, all these details could promote the image quality of the whole system.

In another exemplary embodiment, some equation(s) of parameters, such as those relating to the ratio among parameters could be taken into consideration. For example, a central thickness of the third lens element along the optical axis, CT3, an air gap between the second lens element and the third lens element along the optical axis, AC23, an air gap between the third lens element and the fourth lens element along the optical axis, AC34, could be controlled to satisfy the equation as follows:

$$1.10 \leq (AC23+AC34)/CT3 \qquad \text{Equation (2); or}$$

TL and the sum of all four air gaps from the first lens element to the fifth lens element along the optical axis, AAG, could be controlled to satisfy the equation(s) as follows:

$$4.30 \leq TL/AAG \quad \text{Equation (3); or}$$

CT3, CT5 and a central thickness of the first lens element along the optical axis, CT1, could be controlled to satisfy the equation as follows:

$$3.75 \leq (CT1+CT5)/CT3 \quad \text{Equation (4); or}$$

TL, AC23, an air gap between the first lens element and the second lens element along the optical axis, AC12, and an air gap between the fourth lens element and the fifth lens element along the optical axis, AC45, could be controlled to satisfy the equation as follows:

$$9.80 \leq TL/(AC12+AC23+AC45) \quad \text{Equation (5); or}$$

CT5, AC12, AC23 and AC45 could be controlled to satisfy the equation as follows:

$$1.85 \leq CT5/(AC12+AC23+AC45) \quad \text{Equation (6); or}$$

CT3 and a central thickness of the fourth lens element along the optical axis, CT4, could be controlled to satisfy the equation as follows:

$$1.60 \leq CT4/CT3 \leq 3.40 \quad \text{Equation (7); or}$$

AC12, AC23 and AC45 could be controlled to satisfy the equation as follows:

$$AC23/(AC12+AC45) \leq 2.00 \quad \text{Equation (8); or}$$

AC12, AC23, AC34 and AC45 could be controlled to satisfy the equation as follows:

$$1.60 \leq AC34/(AC12+AC23+AC45) \quad \text{Equation (9); or}$$

CT1, AC12, AC23 and AC45 could be controlled to satisfy the equation as follows:

$$1.80 \leq CT1/(AC12+AC23+AC45) \quad \text{Equation (10); or}$$

CT4, AC12 and AC45 could be controlled to satisfy the equation as follows:

$$5.50 \leq CT4/(AC12+AC45) \quad \text{Equation (11); or}$$

TL and AC34 could be controlled to satisfy the equation as follows:

$$TL/AC34 \leq 10.30 \quad \text{Equation (12); or}$$

CT1, CT3, CT4 and CT5 could be controlled to satisfy the equation as follows:

$$4.00 \leq (CT1+CT4+CT5)/CT3 \quad \text{Equation (13); or}$$

AAG and AC34 could be controlled to satisfy the equation as follows:

$$AAG/AC34 \leq 1.60 \quad \text{Equation (14).}$$

Aforesaid exemplary embodiments are not limited and could be selectively incorporated in other embodiments described herein.

Reference is now made to Equation (1). TL/CT5 is composed by a parameter more likely to be varied, i.e., TL here, and a parameter less likely to be varied, i.e., CT5 here. Shortening of CT5 is limited by its significant effective diameter, but shortening of TL is a way to shorten the length of the optical imaging lens. Therefore with the help of Equation (1), the values of TL and CT5 can be effectively reduced and controlled within a proper range, as well as the length of the optical imaging lens. Additionally, the value of TL/CT5 is suggested for a lower limit, such as $4.0 \leq TL/CT5 \leq 7.8$.

Reference is now made to Equation (2). Considering the smaller effective diameter of the third lens element that provides greater potential to shorten its thickness as well as the length of the optical imaging lens, here the equation is designed. When Equation (2) is satisfied, the values of CT3, AC23 and AC34 are configured properly. Additionally, the value of (AC23+AC34)/CT3 is suggested for an upper limit, such as $1.10 \leq (AC23+AC34)/CT3 \leq 2.50$.

Reference is now made to Equation (3). The equation is designed to address the difficulty faced and precision required in the assembly process which limits the shortening of the air gaps. When Equation (3) is satisfied, the thickness of each lens element and each air gap are configured properly. Additionally, the value of TL/AAG is suggested for an upper limit, such as $4.30 \leq TL/AAG \leq 6.60$.

Reference is now made to Equations (4). Considering shortening of CT5 is limited by its significant effective diameter and shortening of CT3 has more potential due to its smaller effective diameter, here the equation is designed for configuring CT1, CT3 and CT5 properly. Additionally, the value of (CT1+CT5)/CT3 is suggested for an upper limit, such as $3.75 \leq (CT1+CT5)/CT3 \leq 6.00$.

Reference is now made to Equation (5). Considering the difficulty faced and precision required in the assembly process which limits the shortening of the air gaps, here the equation is designed. When Equation (5) is satisfied, the values of TL, AC12, AC23 and AC45 are configured properly. Additionally, the value of TL/(AC12+AC23+AC45) is suggested for an upper limit, such as $9.80 \leq TL/(AC12+AC23+AC45) \leq 17.00$.

Reference is now made to Equation (6). The equation is designed to address that the shortening of CT5 is limited by its significant effective diameter. When Equation (6) is satisfied, the values of CT5, AC12, AC23 and AC45 are configured properly. Additionally, the value of CT5/(AC12+AC23+AC45) is suggested for a lower limit, such as $1.85 \leq CT5/(AC12+AC23+AC45) \leq 3.70$.

Reference is now made to Equation (7). Considering shortening of CT3 has more potential than shortening of CT4 due to the smaller effective diameter of the third lens element, the equation is designed for configuring CT3 and CT4 properly.

Reference is now made to Equation (8). Considering shortening of AC12 and AC45 have more potential than shortening of AC23, the equation is designed for configuring AC12, AC23 and AC45 properly. Additionally, the value of AC23/(AC12+AC45) is suggested for a lower limit, such as $0.20 \leq AC23/(AC12+AC45) \leq 2.00$.

Reference is now made to Equation (9). It is understood that shortening each air gap effectively may result in a shortened length of the optical imaging lens and also good optical characteristics. Considering shortening of AC12, AC23 and AC45 have more potential than shortening of AC34, the equation is designed for configuring AC12, AC23, AC34 and AC45 properly. Additionally, the value of AC34/(AC12+AC23+AC45) is suggested for an upper limit, such as $1.60 \leq AC34/(AC12+AC23+AC45) \leq 3.40$.

Reference is now made to Equation (10). Considering shortening of AC12, AC23 and AC45 have more potential than shortening of CT1, the equation is designed for configuring CT1, AC12, AC23 and AC45 properly. Additionally, the value of CT1/(AC12+AC23+AC45) is suggested for an upper limit, such as $1.80 \leq CT1/(AC12+AC23+AC45) \leq 3.50$.

Reference is now made to Equation (11). Considering shortening of AC12 and AC45 have more potential than shortening of CT4, the equation is designed for configuring CT4, AC12 and AC45 properly. Additionally, the value of CT4/(AC12+AC45) is suggested for a lower limit, such as $5.50 \leq CT4/(AC12+AC45) \leq 6.90$.

Reference is now made to Equation (12). Considering shortening of TL have more potential than shortening of AC34, the equation is designed for configuring TL and AC34 properly. Additionally, the value of TL/AC34 is suggested for a lower limit, such as 6.00≤TL/AC34≤10.30.

Reference is now made to Equation (13). Considering shortening of CT1, CT4 and CT5 are limited by their light convergence function or significant effective diameter and shortening of CT3 has more potential due to its smaller effective diameter, the equation is designed for configuring CT3, CT4 and CT5 properly to achieve a shorter length of the optical imaging lens. Additionally, the value of (CT1+CT4+CT5)/CT3 is suggested for an upper limit, such as 4.00≤(CT1+CT4+CT5)/CT3≤8.50.

Reference is now made to Equation (14). Considering shortening of AAG have more potential than shortening of AC34, the equation is designed for configuring AAG and AC34 properly. Additionally, the value of AAG/AC34 is suggested for a lower limit, such as 1.10≤AAG/AC34≤1.60.

When implementing example embodiments, more details about the convex or concave surface structure and/or the position of an aperture stop may be incorporated for one specific lens element or broadly for plural lens elements to enhance the control of the system performance and/or resolution, as illustrated in the following embodiments. For example, an aperture stop could be positioned before the first lens element, etc. It is noted that the details listed here could be incorporated in example embodiments if no inconsistency occurs.

Figure 2:
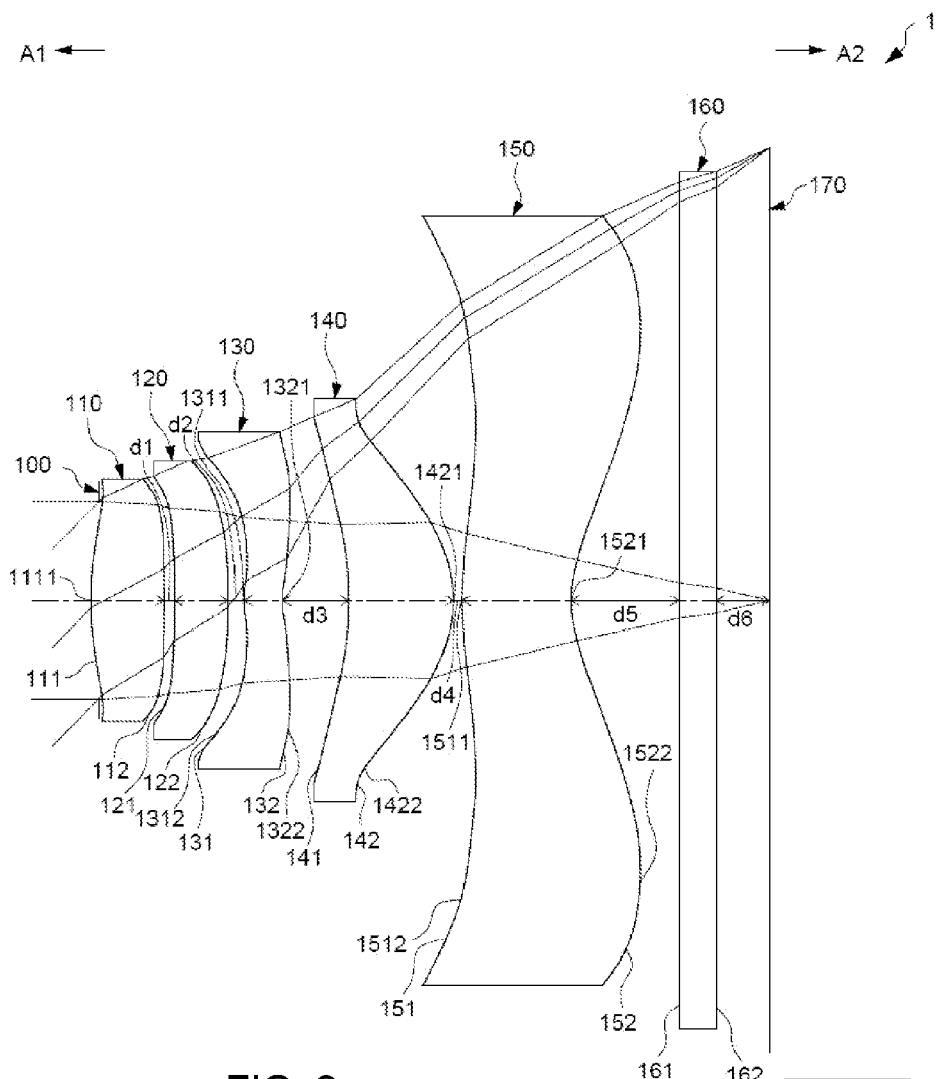
FIG. 2 is a cross-sectional view of a first embodiment of an optical imaging lens having five lens elements according to the present disclosure.
Figure 3:
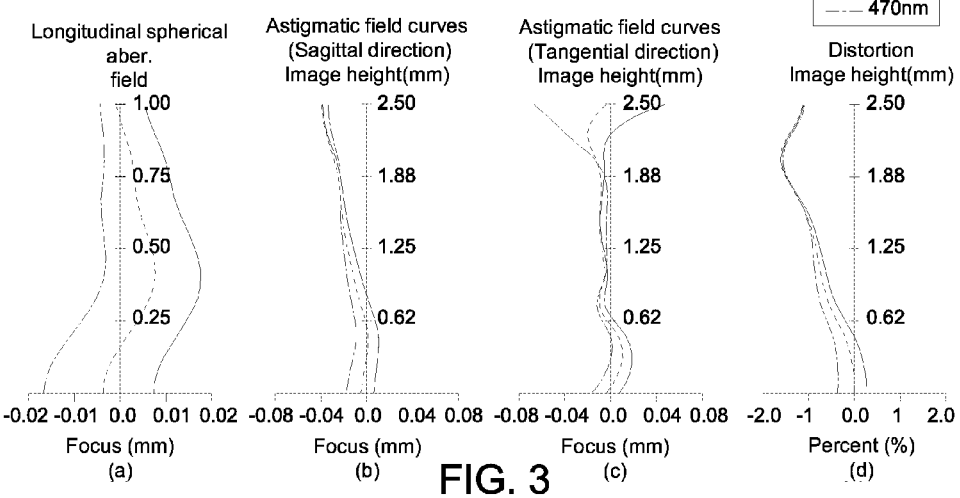
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a shortened length. Reference is now made to FIGS. 2-5. FIG. 2 illustrates an example cross-sectional view of an optical imaging lens 1 having five lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, an aperture stop 100, a first lens element 110, a second lens element 120, a third lens element 130, a fourth lens element 140 and a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 comprises an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Exemplary embodiments of each lens element of the optical imaging lens 1 which may be constructed by plastic material will now be described with reference to the drawings.

An example embodiment of the first lens element 110 may have positive refracting power. The object-side surface 111 and the image-side surface 112 are convex surfaces. The object-side surface 111 further comprises a convex portion 1111 in a vicinity of a periphery of the optical axis.

An example embodiment of the second lens element 120 may have positive refracting power. The object-side surface 121 is a concave surface and the image-side surface 122 is a convex surface.

An example embodiment of the third lens element 130 may have negative refracting power. The object-side surface 131 comprises a convex portion 1311 in a vicinity of the optical axis and a concave portion 1312 in a vicinity of a periphery of the third lens element 130. The image-side surface 132 comprises a concave portion 1321 in a vicinity of the optical axis and a convex portion 1322 in a vicinity of a periphery of the third lens element 130.

An example embodiment of the fourth lens element 140 may have positive refracting power. The object-side surface 141 is a concave surface. The image-side surface 142 comprises a convex portion 1421 in a vicinity of the optical axis and a concave portion 1422 in a vicinity of a periphery of the fourth lens element 140.

An example embodiment of the fifth lens element 150 may have negative refracting power. The object-side surface 151 comprises a convex portion 1511 in a vicinity of the optical axis and a concave portion 1512 in a vicinity of a periphery of the fifth lens element 150. The image-side surface 152 comprises a concave portion 1521 in a vicinity of the optical axis and a convex portion 1522 in a vicinity of a periphery of the fifth lens element 150.

In example embodiments, air gaps exist between the lens elements 110, 120, 130, 140, 150, the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by AC12, the air gap d2 is denoted by AC23, the air gap d3 is denoted by AC34, the air gap d4 is denoted by AC45, and the sum of all air gaps d1, d2, d3 and d4 between the first and fifth lens elements 110, 150 is denoted by AAG.

FIG. 4 depicts the optical characteristics of each lens elements in the optical imaging lens 1 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=4.41, satisfying equation (1);
(AC23+AC34)/CT3=2.06, satisfying equation (2);
TL/AAG=4.78, satisfying equation (3);
(CT1+CT5)/CT3=4.59, satisfying equation (4);
TL/(AC12+AC23+AC45)=12.75, satisfying equation (5);
CT5/(AC12+AC23+AC45)=2.89, satisfying equation (6);
CT4/CT3=2.65, satisfying equation (7);

AC23/(AC12+AC45)=0.98, satisfying equation (8);
AC34/(AC12+AC23+AC45)=1.67, satisfying equation (9);
CT1/(AC12+AC23+AC45)=1.93, satisfying equation (10);
CT4/(AC12+AC45)=5.50, satisfying equation (11);
TL/AC34=7.65, satisfying equation (12);
(CT1+CT4+CT5)/CT3=7.24, satisfying equation (13);
AAG/AC34=1.60, satisfying equation (14);
wherein the distance from the object-side surface 111 of the first lens element 110 to the image plane 170 along the optical axis is 3.77 mm, and the length of the optical imaging lens 1 is shortened.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, and the object-side surface 151 and the image-side surface 152 of the fifth lens element 150 are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), in view of the vertical deviation of each curve, the offset of the off-axis light relative to the image point is within ±0.02 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.08 mm. This reflects the optical imaging lens 1 of the present embodiment eliminates aberration effectively.

Please refer to FIG. 3, distortion aberration (d), which shows the variation of the distortion aberration is within ±2%. Such distortion aberration meets the requirement of acceptable image quality and shows the optical imaging lens 1 of the present embodiment could restrict the distortion aberration to raise the image quality even though the length of the optical imaging lens 1 is shortened to 3.77 mm.

Therefore, the optical imaging lens 1 of the present embodiment shows great characteristics in the longitudinal spherical aberration, astigmatism in the sagittal direction, astigmatism in the tangential direction, and distortion aberration. According to the above illustration, the optical imaging lens 1 of the example embodiment indeed achieves great optical performance and the length of the optical imaging lens 1 is effectively shortened.

Figure 6:
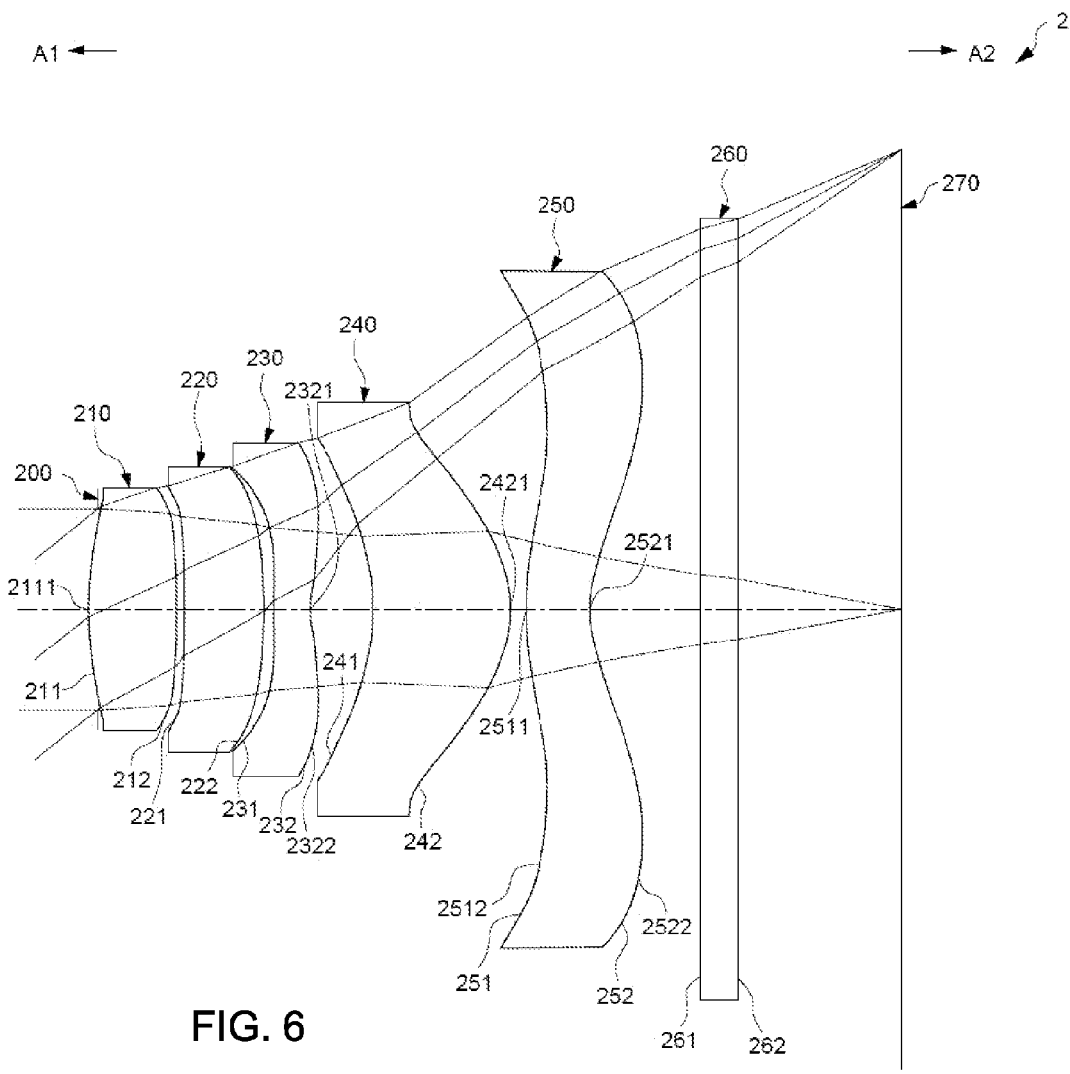
FIG. 6 is a cross-sectional view of a second embodiment of an optical imaging lens having five lens elements according to the present disclosure.
Figure 7:
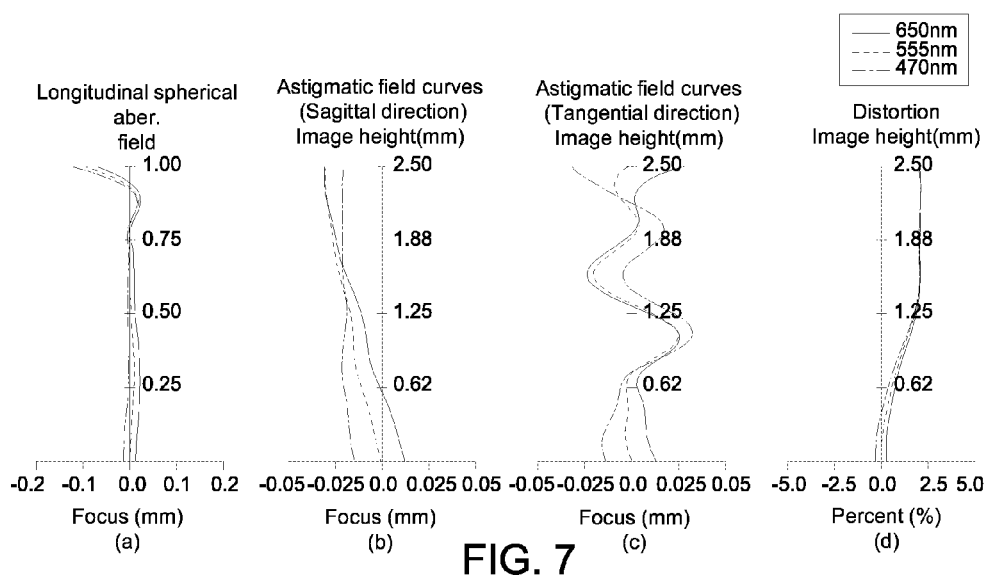
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises an aperture stop 200, the first lens element 210, a second lens element 220, a third lens element 230, a fourth lens element 240 and a fifth lens element 250.

The differences between the second embodiment and the first embodiment are the radius of curvature and thickness of each lens element, the distance of each air gap and the surface shape of the object-side surface 231 and the image-side surface 242, but the configuration of the positive/negative refracting power of the first, second, third, fourth and fifth lens elements 210, 220, 230, 240 and 250 and configuration of the concave/convex shape of surfaces, comprising the object-side surfaces 211, 221, 241, 251 facing to the object side A1 and the image-side surfaces 212, 222, 232, 252 facing to the image side A2, are similar to those in the first embodiment. Specifically, the object-side surface 221 of the second lens element 220 is a concave surface and the image-side surface 232 of the third lens element 230 is a convex surface comprising a convex portion 2321 in a vicinity of the optical axis. Please refer to FIG. 8 for the optical characteristics of each lens elements in the optical imaging lens 2 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=7.79, satisfying equation (1);
(AC23+AC34)/CT3=1.70, satisfying equation (2);
TL/AAG=5.37, satisfying equation (3);
(CT1+CT5)/CT3=3.77, satisfying equation (4);
TL/(AC12+AC23+AC45)=14.41, satisfying equation (5);
CT5/(AC12+AC23+AC45)=1.85, satisfying equation (6);
CT4/CT3=3.42;
AC23/(AC12+AC45)=0.39, satisfying equation (8);
AC34/(AC12+AC23+AC45)=1.68, satisfying equation (9);
CT1/(AC12+AC23+AC45)=2.51, satisfying equation (10);
CT4/(AC12+AC45)=5.50, satisfying equation (11);
TL/AC34=8.56, satisfying equation (12);
(CT1+CT4+CT5)/CT3=7.19, satisfying equation (13);
AAG/AC34=1.59, satisfying equation (14);

wherein the distance from the object-side surface 211 of the first lens element 210 to the image plane 270 along the optical axis is 4.45 mm and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
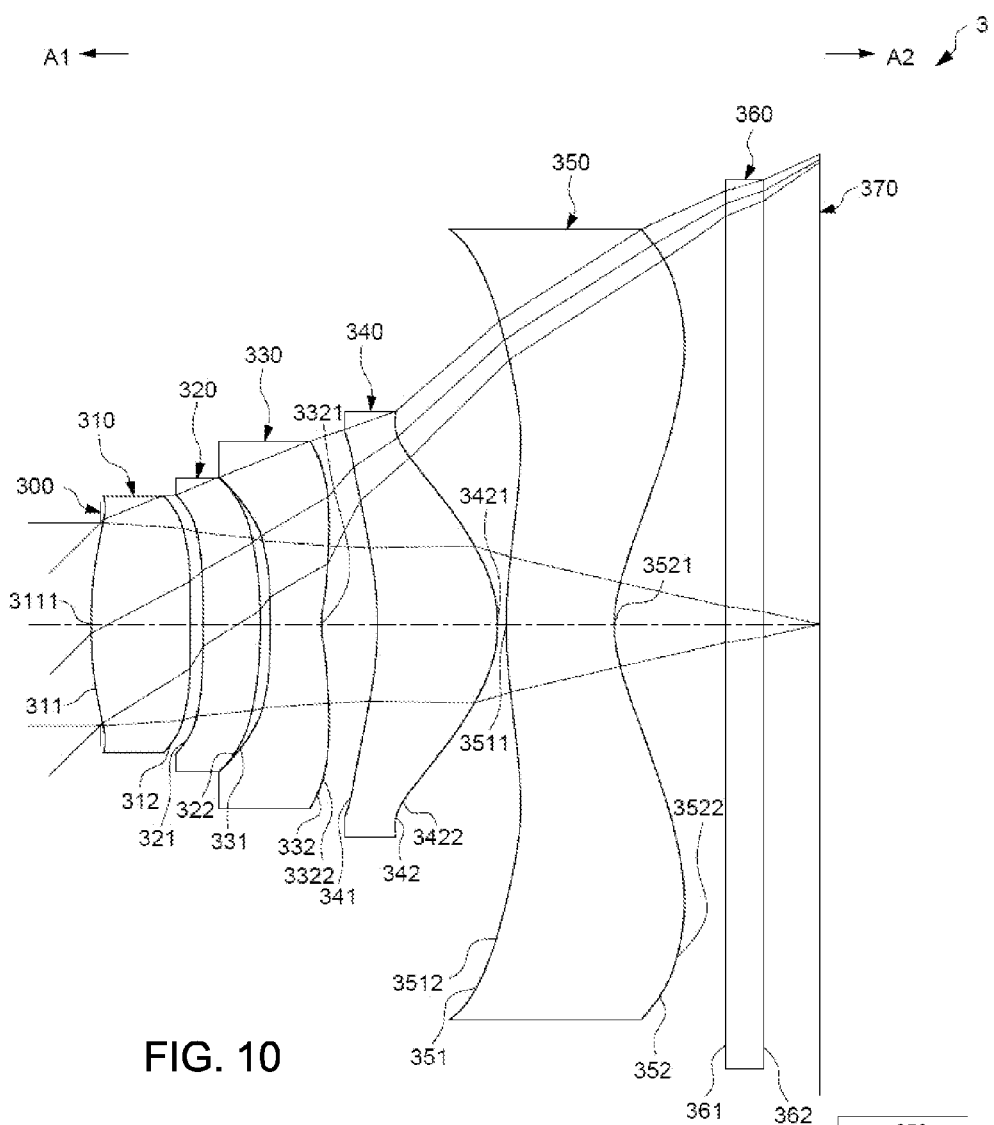
FIG. 10 is a cross-sectional view of a third embodiment of an optical imaging lens having five lens elements according to the present disclosure.
Figure 11:
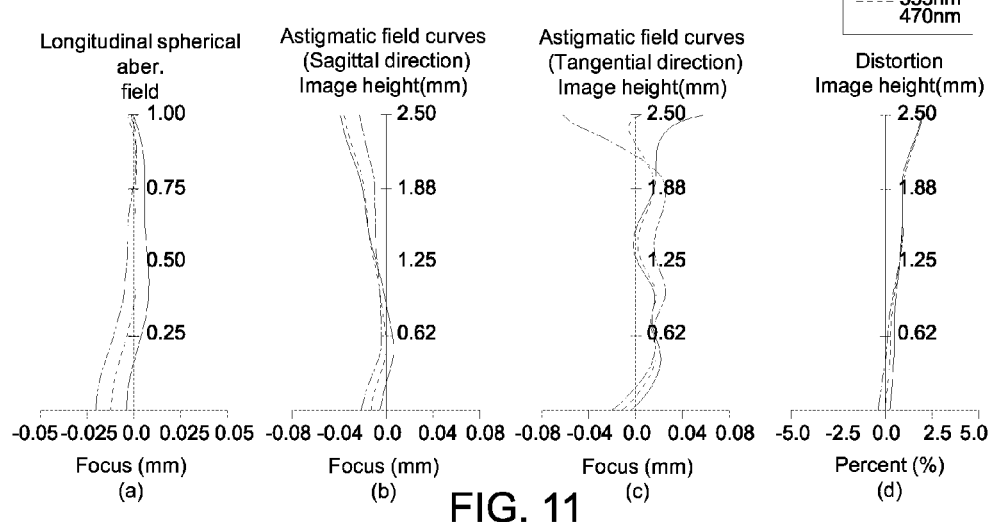
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises an aperture stop 300, the first lens element 310, a second lens element 320, a third lens element 330, a fourth lens element 340 and a fifth lens element 350.

The differences between the third embodiment and the first embodiment are the radius of curvature and thickness of each lens element, the distance of each air gap and the surface shape of the object-side surface 331, but the configuration of the positive/negative refracting power of the first, second, third, fourth and fifth lens elements 310, 320, 330, 340, 350 and configuration of the concave/convex shape of surfaces, comprising the object-side surfaces 311, 321, 331, 341, 351 facing to the object side A1 and the image-side surfaces 312, 322, 332, 342, 352 facing to the image side A2, are similar to those in the first embodiment. Specifically, the object-side surface 331 of the third lens element 330 is a concave surface. Please refer to FIG. 12 for the optical characteristics of each lens elements in the optical imaging lens 3 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=4.85, satisfying equation (1);
(AC23+AC34)/CT3=1.10, satisfying equation (2);
TL/AAG=6.31, satisfying equation (3);
(CT1+CT5)/CT3=3.75, satisfying equation (4);
TL/(AC12+AC23+AC45)=16.84, satisfying equation (5);
CT5/(AC12+AC23+AC45)=3.47, satisfying equation (6);
CT4/CT3=2.17, satisfying equation (7);
AC23/(AC12+AC45)=0.42, satisfying equation (8);
AC34/(AC12+AC23+AC45)=1.67, satisfying equation (9);
CT1/(AC12+AC23+AC45)=3.22, satisfying equation (10);
CT4/(AC12+AC45)=5.50, satisfying equation (11);
TL/AC34=10.10, satisfying equation (12);
(CT1+CT4+CT5)/CT3=5.92, satisfying equation (13);
AAG/AC34=1.60, satisfying equation (14);

wherein the distance from the object-side surface 311 of the first lens element 310 to the image plane 370 along the optical axis is 3.93 mm and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
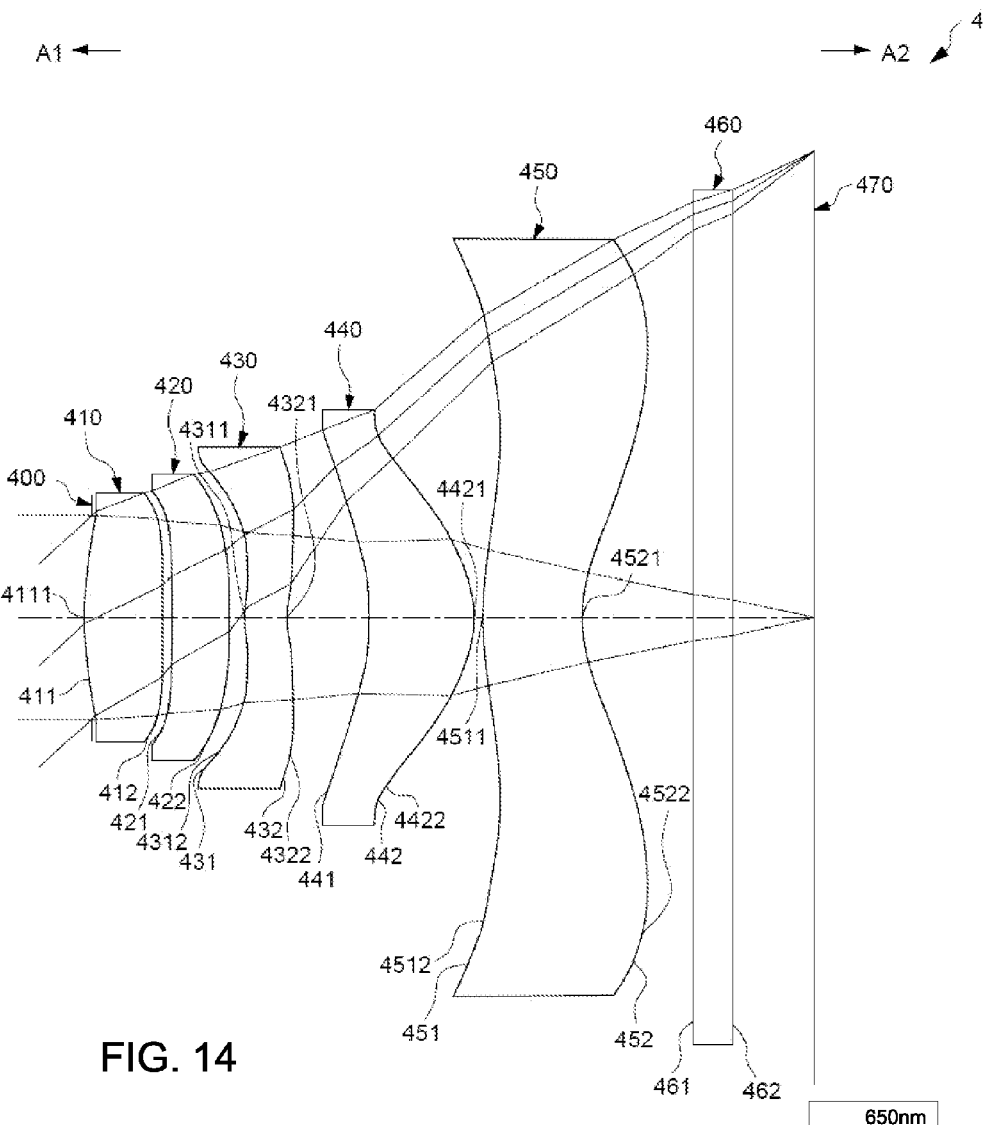
FIG. 14 is a cross-sectional view of a fourth embodiment of an optical imaging lens having five lens elements according to the present disclosure.
Figure 15:
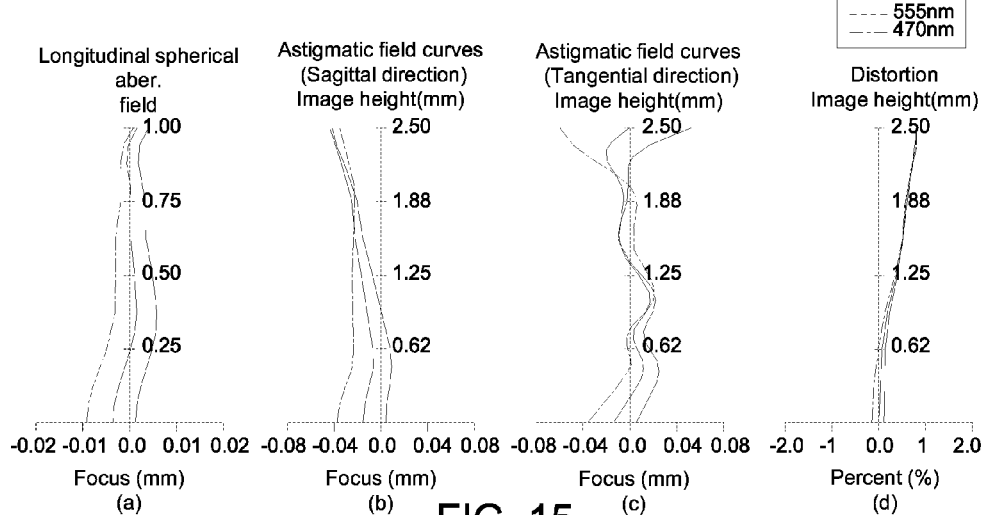
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises an aperture stop 400, the first lens element 410, a second lens element 420, a third lens element 430, a fourth lens element 440 and a fifth lens element 450.

The differences between the fourth embodiment and the first embodiment are the radius of curvature and thickness of each lens element and the distance of each air gap, but the configuration of the positive/negative refracting power of the first, second, third, fourth and fifth lens elements 410, 420, 430, 440, 450 and configuration of the concave/convex shape of surfaces, comprising the object-side surfaces 411, 421, 431, 441, 451 facing to the object side A1 and the image-side surfaces 412, 422, 432, 442, 452 facing to the image side A2, are similar to those in the first embodiment. Please refer to FIG. 16 for the optical characteristics of each lens elements in the optical imaging lens 4 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=5.04, satisfying equation (1);
(AC23+AC34)/CT3=2.27, satisfying equation (2);
TL/AAG=4.30, satisfying equation (3);
(CT1+CT5)/CT3=4.16, satisfying equation (4);
TL/(AC12+AC23+AC45)=13.24, satisfying equation (5);
CT5/(AC12+AC23+AC45)=2.63, satisfying equation (6);
CT4/CT3=2.46, satisfying equation (7);
AC23/(AC12+AC45)=0.98, satisfying equation (8);

AC34/(AC12+AC23+AC45)=2.08, satisfying equation (9);
CT1/(AC12+AC23+AC45)=2.09, satisfying equation (10);
CT4/(AC12+AC45)=5.51, satisfying equation (11);
TL/AC34=6.37, satisfying equation (12);
(CT1+CT4+CT5)/CT3=6.63, satisfying equation (13);
AAG/AC34=1.48, satisfying equation (14);
wherein the distance from the object-side surface 411 of the first lens element 410 to the image plane 470 along the optical axis is 3.93 mm and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
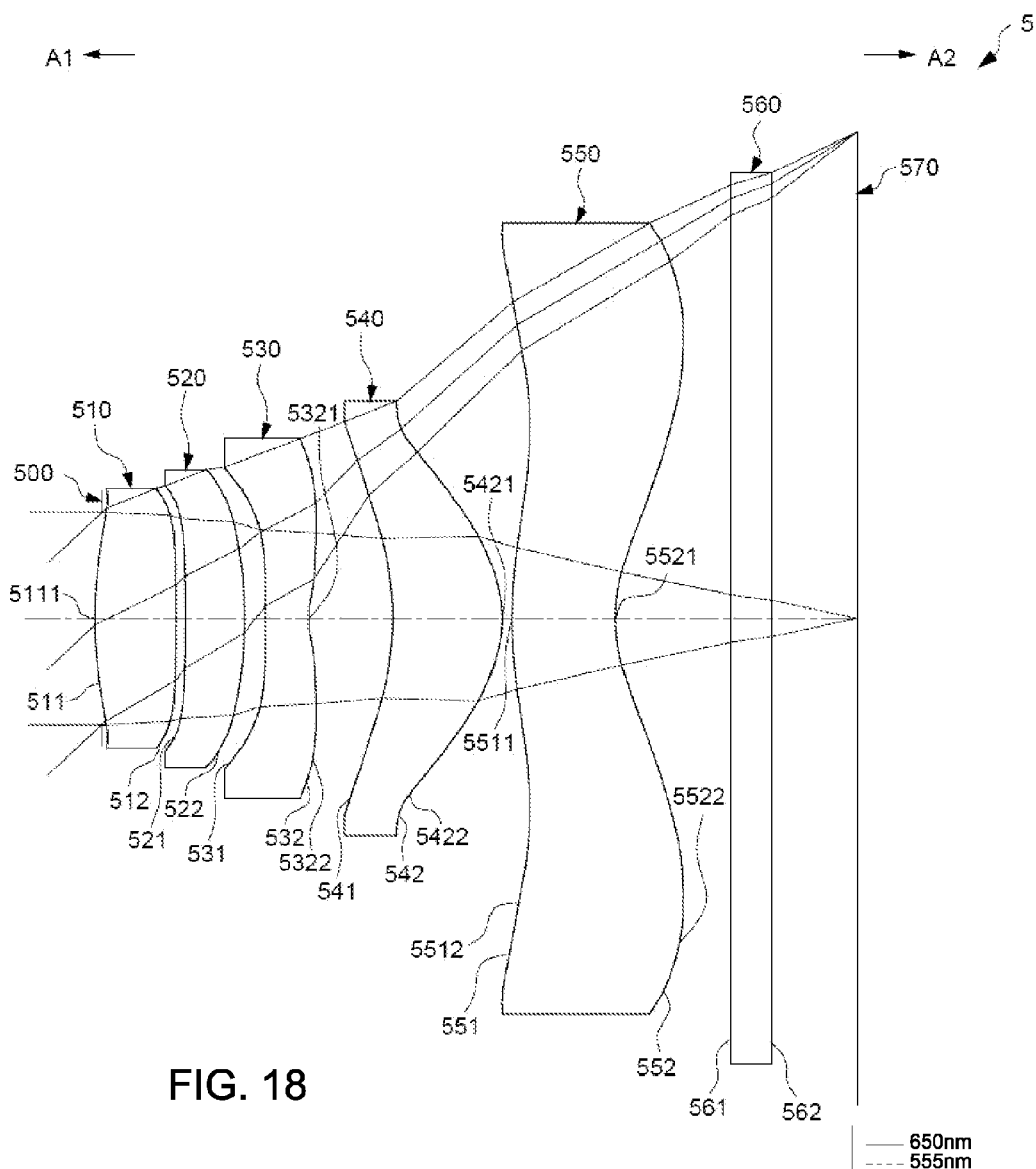
FIG. 18 is a cross-sectional view of a fifth embodiment of an optical imaging lens having five lens elements according to the present disclosure.
Figure 19:
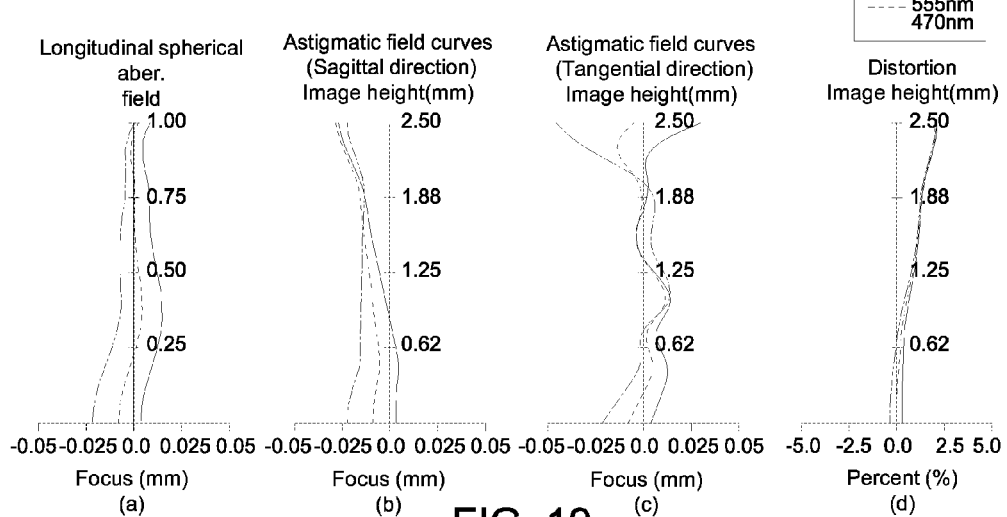
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises an aperture stop 500, the first lens element 510, a second lens element 520, a third lens element 530, a fourth lens element 540 and a fifth lens element 550.

The differences between the fifth embodiment and the first embodiment are the radius of curvature and thickness of each lens element, the distance of each air gap and the surface shape of the object-side surface 531, but the configuration of the positive/negative refracting power of the first, second, third, fourth and fifth lens elements 510, 520, 530, 540, 550 and configuration of the concave/convex shape of surfaces, comprising the object-side surfaces 511, 521, 531, 541, 551 facing to the object side A1 and the image-side surfaces 512, 522, 532, 542, 552 facing to the image side A2, are similar to those in the first embodiment. Specifically, the object-side surface 531 of the third lens element 530 is a concave surface. Please refer to FIG. 20 for the optical characteristics of each lens elements in the optical imaging lens 5 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=5.04, satisfying equation (1);
(AC23+AC34)/CT3=2.13, satisfying equation (2);
TL/AAG=4.30, satisfying equation (3);
(CT1+CT5)/CT3=3.88, satisfying equation (4);
TL/(AC12+AC23+AC45)=12.59, satisfying equation (5);
CT5/(AC12+AC23+AC45)=2.50, satisfying equation (6);
CT4/CT3=2.31, satisfying equation (7);
AC23/(AC12+AC45)=1.07, satisfying equation (8);
AC34/(AC12+AC23+AC45)=1.93, satisfying equation (9);
CT1/(AC12+AC23+AC45)=1.95, satisfying equation (10);
CT4/(AC12+AC45)=5.50, satisfying equation (11);
TL/AC34=6.54, satisfying equation (12);
(CT1+CT4+CT5)/CT3=6.19, satisfying equation (13);
AAG/AC34=1.52, satisfying equation (14);
wherein the distance from the object-side surface 511 of the first lens element 510 to the image plane 570 along the optical axis is 3.94 mm and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
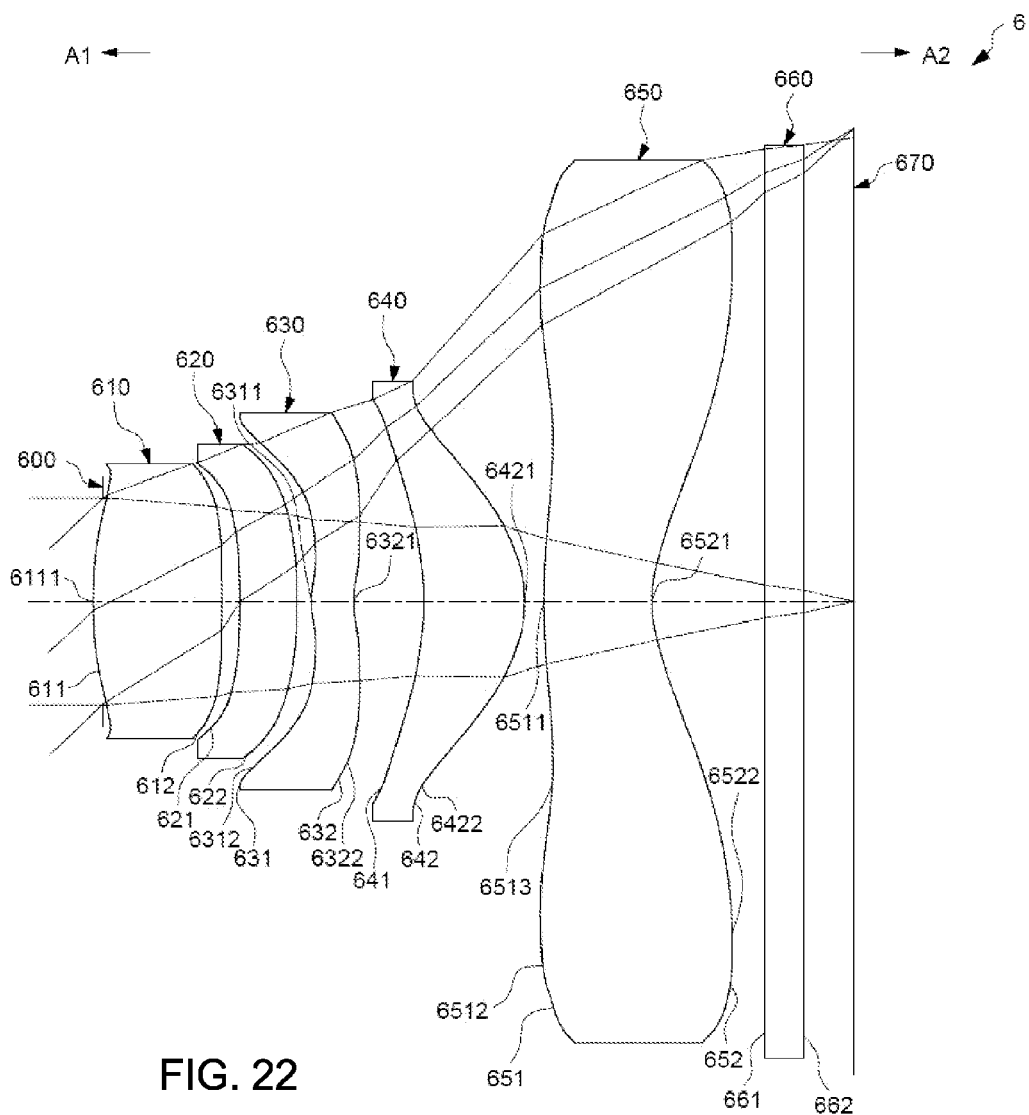
FIG. 22 is a cross-sectional view of a sixth embodiment of an optical imaging lens having five lens elements according to the present disclosure.
Figure 23:
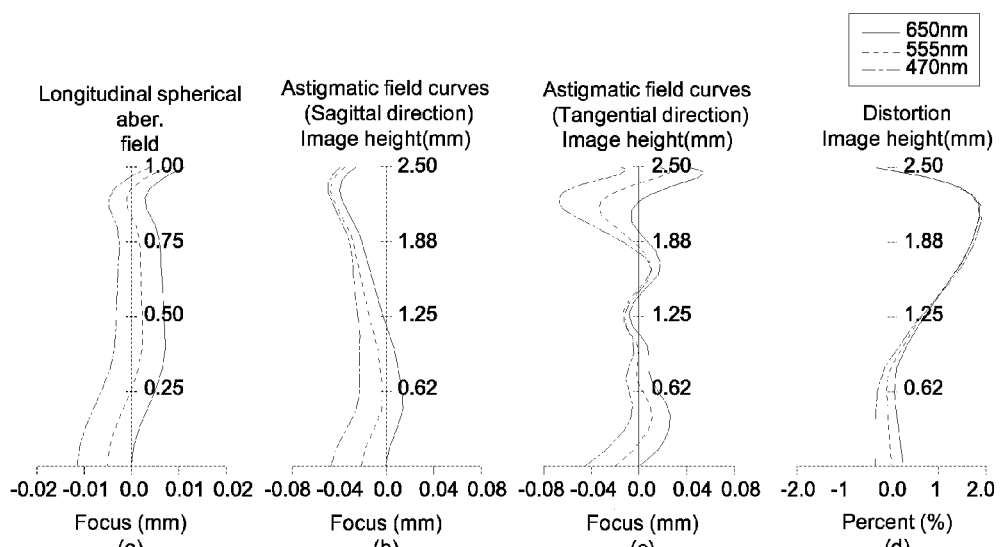
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises an aperture stop 600, the first lens element 610, a second lens element 620, a third lens element 630, a fourth lens element 640 and a fifth lens element 650.

The differences between the sixth embodiment and the first embodiment are the radius of curvature and thickness of each lens element, the distance of each air gap and the surface shape of the object-side surface 651, but the configuration of the positive/negative refracting power of the first, second, third, fourth and fifth lens elements 610, 620, 630, 640, 650 and configuration of the concave/convex shape of surfaces, comprising the object-side surfaces 611, 621, 631, 641, 651 facing to the object side A1 and the image-side surfaces 612, 622, 632, 642, 652 facing to the image side A2, are similar to those in the first embodiment. Specifically, the object-side surface 651 of the fifth lens element 650 comprises a convex portion 6511 in a vicinity of the optical axis, a convex portion 6512 in a vicinity of a periphery of the fifth lens element 650 and a concave portion 6513 between the vicinity of the optical axis and the vicinity of the periphery of the fifth lens element 650. Please refer to FIG. 24 for the optical characteristics of each lens elements in the optical imaging lens 6 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=5.15, satisfying equation (1);
(AC23+AC34)/CT3=2.06, satisfying equation (2);
TL/AAG=4.55, satisfying equation (3);
(CT1+CT5)/CT3=5.72, satisfying equation (4);
TL/(AC12+AC23+AC45)=9.90, satisfying equation (5);
CT5/(AC12+AC23+AC45)=1.92, satisfying equation (6);
CT4/CT3=2.44, satisfying equation (7);
AC23/(AC12+AC45)=0.50, satisfying equation (8);
AC34/(AC12+AC23+AC45)=1.18;
CT1/(AC12+AC23+AC45)=2.28, satisfying equation (10);
CT4/(AC12+AC45)=2.69;
TL/AC34=8.42, satisfying equation (12);
(CT1+CT4+CT5)/CT3=8.17, satisfying equation (13);
AAG/AC34=1.85;

wherein the distance from the object-side surface 611 of the first lens element 610 to the image plane 670 along the optical axis is 4.03 mm and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
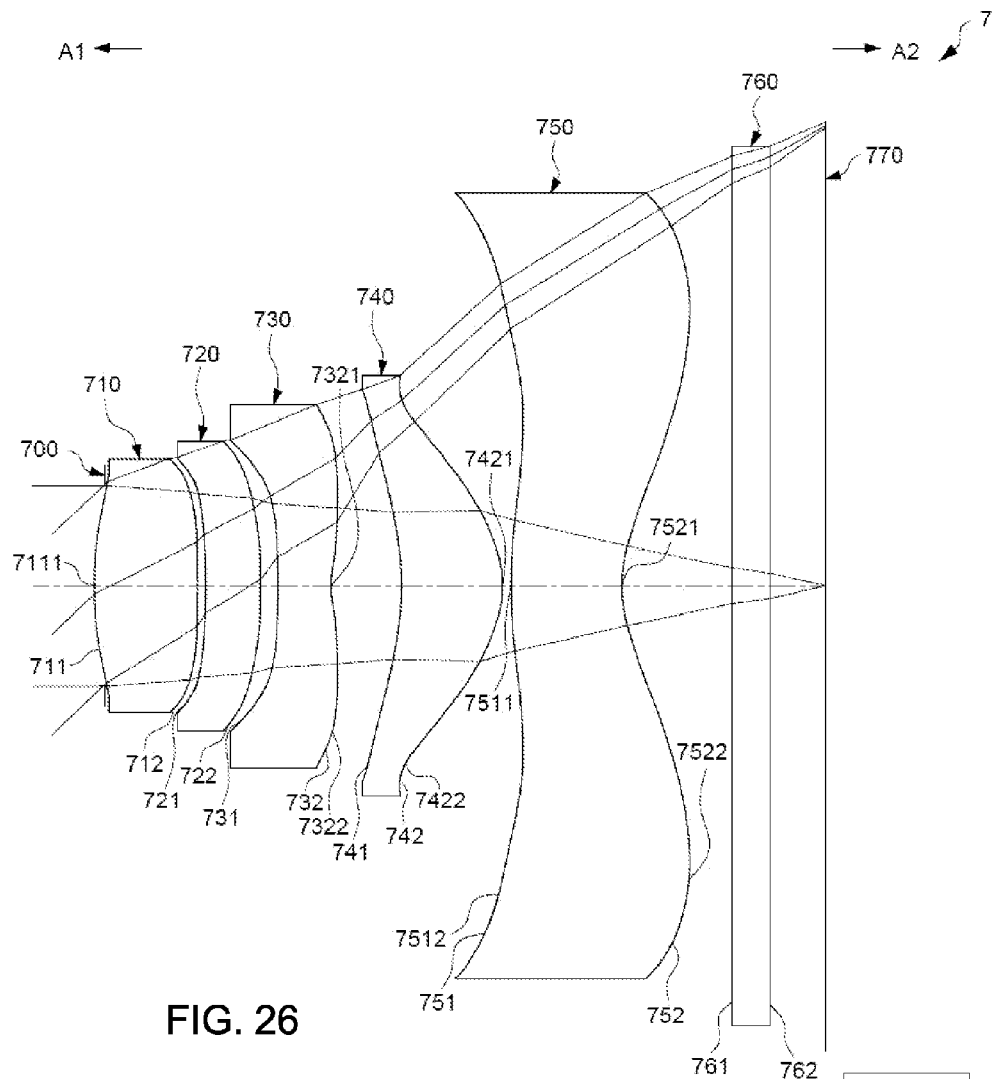
FIG. 26 is a cross-sectional view of a seventh embodiment of an optical imaging lens having five lens elements according to the present disclosure.
Figure 27:
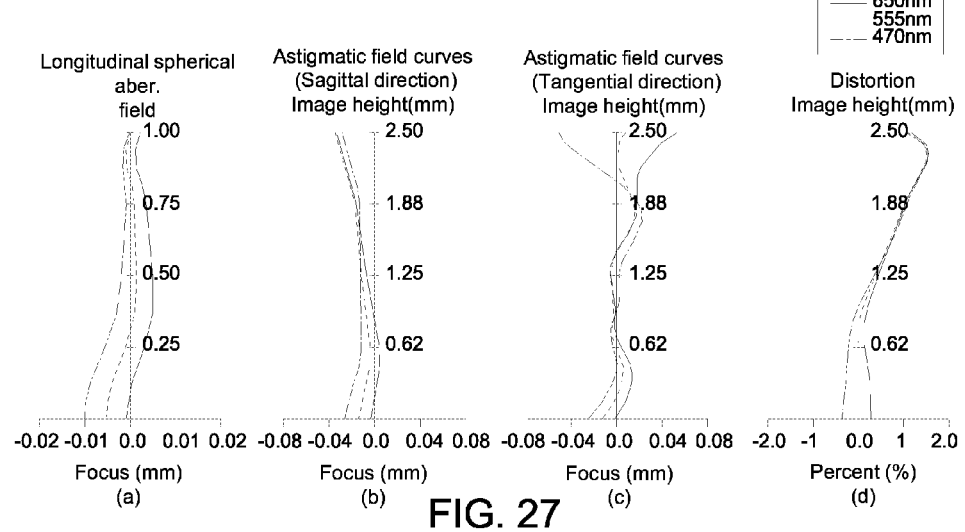
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having five lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises an aperture stop 700, the first lens element 710, a second lens element 720, a third lens element 730, a fourth lens element 740 and a fifth lens element 750.

The differences between the seventh embodiment and the first embodiment are the radius of curvature and thickness of each lens element, the distance of each air gap and the surface shape of the object-side surface 731, but the configuration of the positive/negative refracting power of the first, second, third, fourth and fifth lens elements 710, 720, 730, 740, 750 and configuration of the concave/convex shape of surfaces, comprising the object-side surfaces 711, 721, 731, 741, 751 facing to the object side A1 and the image-side surfaces 712, 722, 732, 742, 752 facing to the image side A2, are similar to those in the first embodiment. Specifically, the object-side surface 731 of the third lens element 730 is a concave surface.

Please refer to FIG. 28 for the optical characteristics of each lens elements in the optical imaging lens 7 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=4.76, satisfying equation (1);
(AC23+AC34)/CT3=1.47, satisfying equation (2);
TL/AAG=5.18, satisfying equation (3);
(CT1+CT5)/CT3=3.75, satisfying equation (4);
TL/(AC12+AC23+AC45)=14.94, satisfying equation (5);
CT5/(AC12+AC23+AC45)=3.14, satisfying equation (6);
CT4/CT3=1.76, satisfying equation (7);
AC23/(AC12+AC45)=0.93, satisfying equation (8);
AC34/(AC12+AC23+AC45)=1.88, satisfying equation (9);
CT1/(AC12+AC23+AC45)=2.90, satisfying equation (10);
CT4/(AC12+AC45)=5.50, satisfying equation (11);
TL/AC34=7.93, satisfying equation (12);
(CT1+CT4+CT5)/CT3=5.51, satisfying equation (13);
AAG/AC34=1.53, satisfying equation (14);

wherein the distance from the object-side surface 711 of the first lens element 710 to the image plane 770 along the optical axis is 3.99 mm and the length of the optical imaging lens 7 is shortened.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Figure 30:
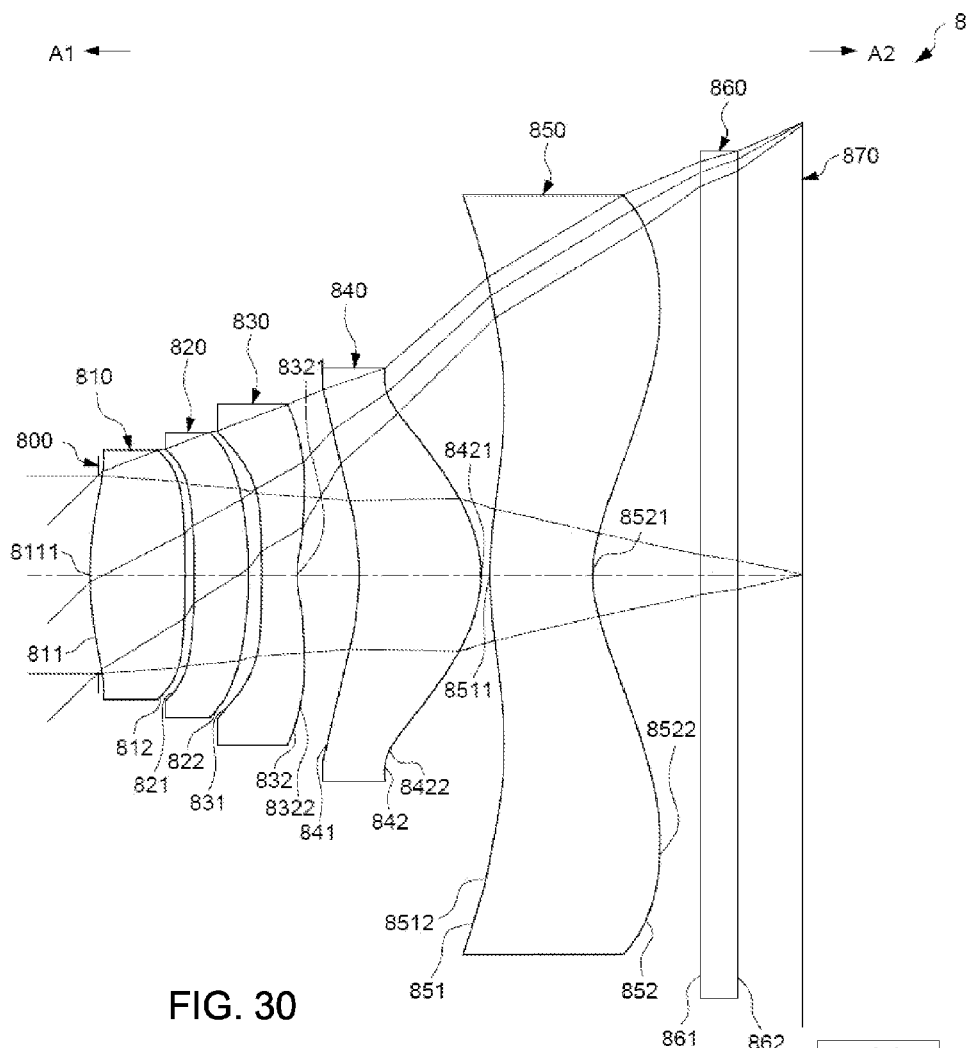
FIG. 30 is a cross-sectional view of a eighth embodiment of an optical imaging lens having five lens elements according to the present disclosure.
Figure 31:
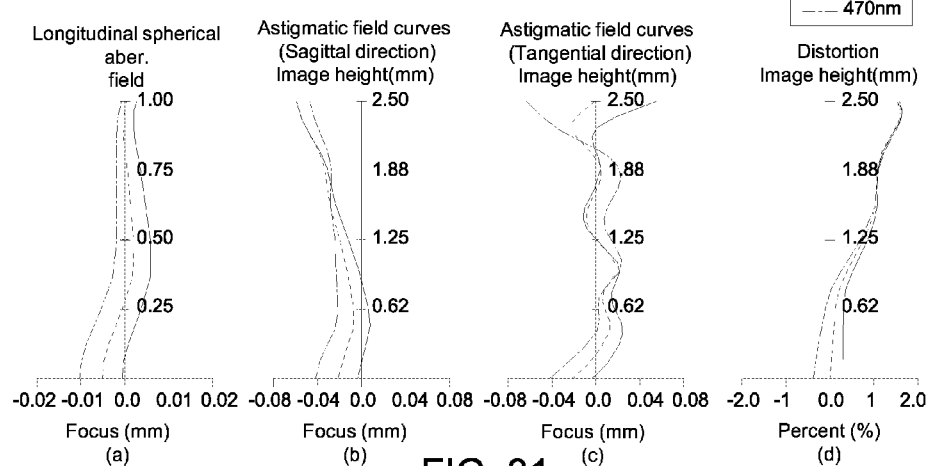
FIG. 31 is a chart of longitudinal spherical aberration and other kinds of optical aberrations of a eighth embodiment of the optical imaging lens according the present disclosure.

Reference is now made to FIGS. 30-33. FIG. 30 illustrates an example cross-sectional view of an optical imaging lens 8 having five lens elements of the optical imaging lens according to a eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises an aperture stop 800, the first lens element 810, a second lens element 820, a third lens element 830, a fourth lens element 840 and a fifth lens element 850.

The differences between the eighth embodiment and the first embodiment are the radius of curvature and thickness of each lens element, the distance of each air gap and the surface shape of the object-side surface 831, but the configuration of the positive/negative refracting power of the first, second, third, fourth and fifth lens elements 810, 820, 830, 840, 850 and configuration of the concave/convex shape of surfaces, comprising the object-side surfaces 811, 821, 831, 841, 851 facing to the object side A1 and the image-side surfaces 812, 822, 832, 842, 852 facing to the image side A2, are similar to those in the first embodiment. Specifically, the object-side surface 831 of the third lens element 830 is a concave surface. Please refer to FIG. 32 for the optical characteristics of each lens elements in the optical imaging lens 8 of the present embodiment, wherein the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 are:

TL/CT5=4.91, satisfying equation (1);
(AC23+AC34)/CT3=1.79, satisfying equation (2);
TL/AAG=5.62, satisfying equation (3);
(CT1+CT5)/CT3=4.98, satisfying equation (4);
TL/(AC12+AC23+AC45)=15.67, satisfying equation (5);
CT5/(AC12+AC23+AC45)=3.19, satisfying equation (6);
CT4/CT3=3.10, satisfying equation (7);
AC23/(AC12+AC45)=0.73, satisfying equation (8);
AC34/(AC12+AC23+AC45)=1.79, satisfying equation (9);
CT1/(AC12+AC23+AC45)=2.95, satisfying equation (10);
CT4/(AC12+AC45)=6.60, satisfying equation (11);
TL/AC34=8.76, satisfying equation (12);
(CT1+CT4+CT5)/CT3=8.09, satisfying equation (13);
AAG/AC34=1.56, satisfying equation (14);

wherein the distance from the object-side surface 811 of the first lens element 810 to the image plane 870 along the optical axis is 3.95 mm and the length of the optical imaging lens 8 is shortened.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 8 is effectively shortened.

Please refer to FIG. 34, which shows the values of TL/CT5, (AC23+AC34)/CT3, TL/AAG, (CT1+CT5)/CT3, TL/(AC12+AC23+AC45), CT5/(AC12+AC23+AC45), CT4/CT3, AC23/(AC12+AC45), AC34/(AC12+AC23+AC45), CT1/(AC12+AC23+AC45), CT4/(AC12+AC45), TL/AC34, (CT1+CT4+CT5)/CT3 and AAG/AC34 of all ninth embodiments, and it is clear that the optical imaging lens of the present invention satisfy the Equations (1), (2), (3), (4), (5), (6), (7), (8), (9), (10, (11), (12), (13) and/or (14).

Figure 35:
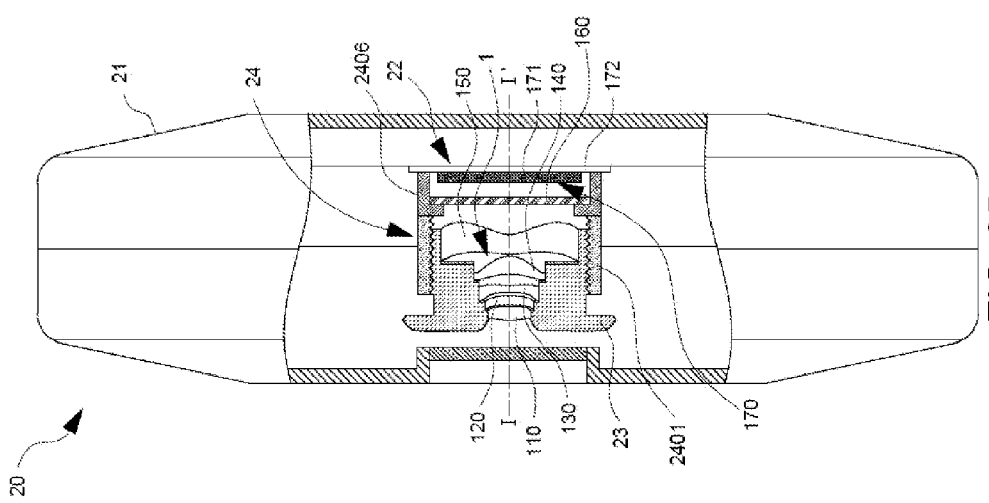
FIG. 35 is a structure of an example embodiment of a mobile device.

Reference is now made to FIG. 35, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 35, the photography module 22 may comprise an aforesaid optical imaging lens with five lens elements, for example, the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since a COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 171. The lens barrel 23 and the lens backseat 2401 are positioned along a same axis I-I', and the lens backseat 2401 is close to the outside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 3.77 mm, the size of the mobile device 20 may be quite small. Therefore, the embodiments described herein meet the market demand for smaller sized product designs.

Figure 36:
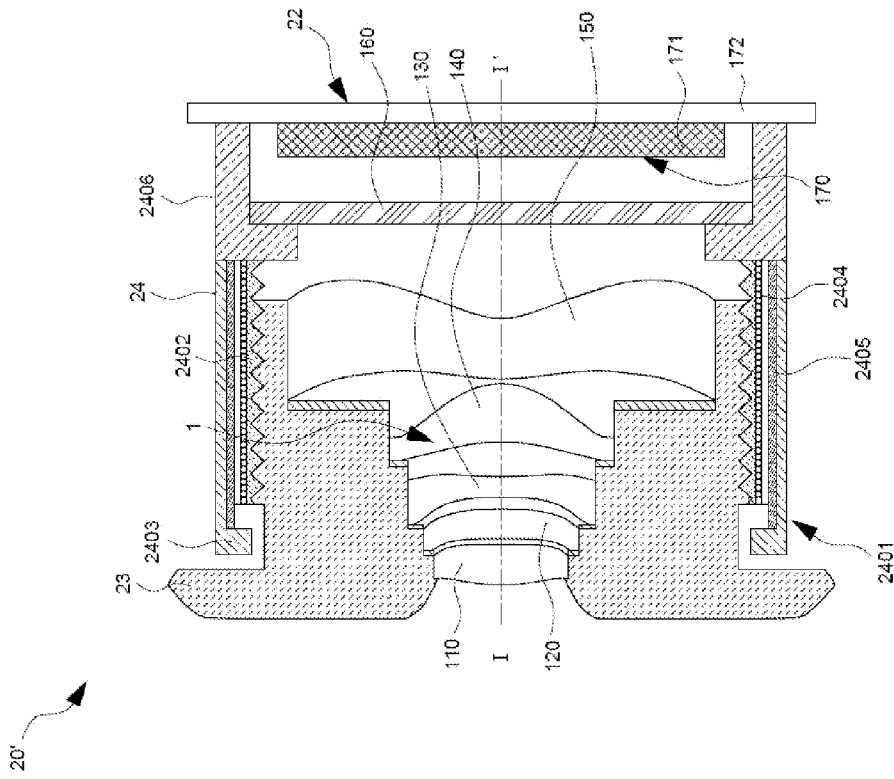
FIG. 36 is a partially enlarged view of the structure of another example embodiment of a mobile device.

Reference is now made to FIG. 36, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 3.77 mm, is shortened, the mobile device 20' can be designed with a smaller size while still maintaining good optical performance. Therefore, the present embodiment meets the demand of a small sized product design and the request of the market.

According to the above illustration, it is clear that the mobile device and the optical imaging lens thereof in example embodiments, through controlling the detail structure and/or reflection power of the lens elements, the length of the optical imaging lens is effectively shortened and good optical characteristics are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of the first, second, third, fourth and fifth lens elements having an object-side surface facing toward the object side and an image-side surface facing toward the image side, wherein:

the object-side surface of the first lens element comprises a convex portion in a vicinity of the optical axis, the image-side surface of the first lens element comprises a convex portion in a vicinity of the optical axis;

the second lens element has positive refracting power;

the image-side surface of the third lens element comprises a convex portion in a vicinity of a periphery of the third lens element;

the image-side surface of the fourth lens element comprises a convex portion in a vicinity of the optical axis;

the image-side surface of the fifth lens element comprises a concave portion in a vicinity of the optical axis and a convex portion in a vicinity of a periphery of the fifth lens element;

the optical imaging lens as a whole comprises only the five lens elements having refracting power; and a distance between the object-side surface of the first lens element and the image-side surface of the fifth lens element along the optical axis is TL, a central thickness of the fifth lens element along the optical axis is CT5, and TL and CT5 satisfy the equation:

$TL/CT5 \leq 7.80$;

an air gap between the third lens element and the fourth lens element along the optical axis is AC34, and TL and AC34 satisfy the equation:

$6.00 \leq TL/AC34 \leq 10.30$.

2. The optical imaging lens according to claim 1, wherein the image-side surface of the third lens element comprises a concave portion in a vicinity of the optical axis.

3. The optical imaging lens according to claim 2, wherein a central thickness of the third lens element along the optical axis is CT3, an air gap between the second lens element and the third lens element along the optical axis is AC23, and CT3, AC23 and AC34 satisfy the equation:

$1.10 \leq (AC23+AC34)/CT3 \leq 2.50$; and wherein the object-side surface of the fifth lens element comprises a convex portion in a vicinity of the optical axis.

4. The optical imaging lens according to claim 3, wherein a sum of all four air gaps from the first lens element to the fifth lens element along the optical axis is AAG, and TL and AAG satisfy the equation:

$4.30 \leq TL/AAG \leq 6.60$.

5. The optical imaging lens according to claim 4, wherein a central thickness of the first lens element along the optical axis is CT1, and CT1, CT3 and CT5 satisfy the equation:

$3.75 \leq (CT1+CT5)/CT3 \leq 6.00$.

6. The optical imaging lens according to claim 5, wherein an air gap between the first lens element and the second lens element along the optical axis is AC12, an air gap between the fourth lens element and the fifth lens element along the optical axis is AC45, and TL, AC12, AC23 and AC45 satisfy the equation:

$9.80 \leq TL/(AC12+AC23+AC45) \leq 17.00$.

7. The optical imaging lens according to claim 5, wherein an air gap between the first lens element and the second lens element along the optical axis is AC12, an air gap between the fourth lens element and the fifth lens element along the optical axis is AC45, and CT5, AC12, AC23 and AC45 satisfy the equation:

$1.85 \leq CT5/(AC12+AC23+AC45) \leq 3.70$.

8. The optical imaging lens according to claim 5, wherein a central thickness of the fourth lens element along the optical axis is CT4, and CT3 and CT4 satisfy the equation:

$1.60 \leq CT4/CT3 \leq 3.40$.

9. The optical imaging lens according to claim 5, wherein an air gap between the first lens element and the second lens element along the optical axis is AC12, an air gap between the fourth lens element and the fifth lens element along the optical axis is AC45, and AC12, AC23 and AC45 satisfy the equation:

$0.20 \leq AC23/(AC12+AC45) \leq 2.00$.

10. The optical imaging lens according to claim 2, wherein a central thickness of the first lens element along the optical axis is CT1, a central thickness of the third lens element along the optical axis is CT3, and CT1, CT3 and CT5 satisfy the equation:

$3.75 \leq (CT1+CT5)/CT3 \leq 6.00$.

11. The optical imaging lens according to claim 10, wherein an air gap between the first lens element and the second lens element along the optical axis is AC12, an air gap between the second lens element and the third lens element along the optical axis is AC23, an air gap between the fourth lens element and the fifth lens element along the optical axis is AC45, and AC12, AC23, AC34 and AC45 satisfy the equation:

$1.60 \leq AC34/(AC12+AC23+AC45) \leq 3.40$.

12. The optical imaging lens according to claim 11, further comprising an aperture stop positioned before the first lens element.

13. The optical imaging lens according to claim 10, wherein an air gap between the first lens element and the second lens element along the optical axis is AC12, an air gap between the second lens element and the third lens element along the optical axis is AC23, an air gap between the fourth lens element and the fifth lens element along the optical axis is AC45, and CT1, AG12, AC23 and AG45 satisfy the equation:

$$1.80 \leq CT1/(AC12+AC23+AC45) \leq 3.50.$$

14. The optical imaging lens according to claim 10, wherein a central thickness of the fourth lens element along the optical axis is CT4, an air gap between the first lens element and the second lens element along the optical axis is AC12, an air gap between the fourth lens element and the fifth lens element along the optical axis is AC45, and CT4, AC12 and AC45 satisfy the equation:

$$5.50 \leq CT4/(AC12+AC45) \leq 6.90.$$

15. The optical imaging lens according to claim 2, wherein a central thickness of the first lens element along the optical axis is CT1, a central thickness of the third lens element along the optical axis is CT3, a central thickness of the fourth lens element along the optical axis is CT4, and CT1, CT3, CT4 and CT5 satisfy the equation:

$$4.00 \leq (CT1+CT4+CT5)/CT3 \leq 8.50; \text{ and}$$

wherein the object-side surface of the fifth lens element comprises a convex portion in a vicinity of the optical axis.

16. The optical imaging lens according to claim 15, wherein a sum of all four air gaps from the first lens element to the fifth lens element along the optical axis is AAG, and AAG and AC34 satisfy the equation:

$$1.10 \leq AAG/AC34 \leq 1.60.$$

17. A mobile device, comprising:
a housing; and
a photography module positioned in the housing and comprising:
 the optical imaging lens as claimed in claim 1;
 a lens barrel for positioning the optical imaging lens;
 a module housing unit for positioning the lens barrel; and
an image sensor positioned at the image side of the optical imaging lens.

\* \* \* \* \*